(12) United States Patent
Harris

(10) Patent No.: US 9,338,392 B1
(45) Date of Patent: May 10, 2016

(54) HOUGH TRANSFORMATION DEINTERLACING CIRCUITRY

(71) Applicant: Altera Corporation, San Jose, CA (US)

(72) Inventor: Jon Michael Harris, North Stoke (GB)

(73) Assignee: Altera Corporation, San Jose, CA (US)

( * ) Notice: Subject to any disclaimer, the term of this patent is extended or adjusted under 35 U.S.C. 154(b) by 6 days.

(21) Appl. No.: 14/229,480

(22) Filed: Mar. 28, 2014

(51) Int. Cl.
*H04N 7/01* (2006.01)

(52) U.S. Cl.
CPC ............ *H04N 7/0142* (2013.01); *H04N 7/012* (2013.01)

(58) Field of Classification Search
CPC .............................. H04N 7/0142; H04N 7/012
See application file for complete search history.

(56) References Cited

U.S. PATENT DOCUMENTS

| | | | |
|---|---|---|---|
| 6,005,978 A * | 12/1999 | Garakani | 382/218 |
| 7,202,908 B2 | 4/2007 | Zhou et al. | |
| 7,738,730 B2 | 6/2010 | Hawley | |
| 8,072,540 B2 | 12/2011 | Hsu | |
| 8,150,211 B2 | 4/2012 | Li et al. | |
| 2003/0228057 A1 | 12/2003 | Paquette | |
| 2004/0160528 A1 * | 8/2004 | Zhou et al. | 348/452 |
| 2010/0046842 A1 * | 2/2010 | Conwell | 382/218 |
| 2010/0085476 A1 * | 4/2010 | Hsu | 348/448 |
| 2013/0114906 A1 | 5/2013 | Diggins | |
| 2014/0267922 A1 * | 9/2014 | Tao et al. | 348/660 |

\* cited by examiner

*Primary Examiner* — Jefferey Harold
*Assistant Examiner* — Sean Haiem
(74) *Attorney, Agent, or Firm* — Treyz Law Group, P.C.; Michael H. Lyons; Andrew C. Milhollin

(57) ABSTRACT

Integrated circuits with interpolating circuitry for deinterlacing video data are provided. Each frame of video data may include a field of pixels from every-other row of the frame. Edge detection circuitry may generate an edge map for the field. The edge map may be filtered to remove weak edges from the map. Cartesian Hough transformation circuitry may perform Cartesian Hough transforms on the filtered edge map to generate a Cartesian Hough space histogram. The Cartesian Hough space histogram may be filtered to remove bins having insufficient counts. Offset mask generation circuitry may generate an offset mask based on the Cartesian Hough space histogram. Interpolation circuitry may generate interpolated pixel values for missing rows of the field using pixels from the field and the offset mask. The interpolating circuitry may generate deinterlaced video data that is free from image artifacts along low-angle edges using the interpolated pixel values.

22 Claims, 13 Drawing Sheets

121

| 2 | 1 | 0 | 0 | 0 | 0 | 0 | 0 | 0 |
|---|---|---|---|---|---|---|---|---|
| 0 | 1 | 1 | 0 | 0 | 25 | 0 | 1 | 0 |
| 3 | 0 | 20 | 25 | 0 | 0 | 1 | 0 | 0 |
| 16 | 18 | 2 | 1 | 0 | 0 | 0 | 0 | 0 |
| 1 | 20 | 3 | 4 | 0 | 0 | 0 | 0 | 0 |
| 0 | 4 | 1 | 2 | 0 | 2 | 0 | 1 | 0 |
| 0 | 1 | 0 | 1 | 1 | 0 | 0 | 0 | 0 |
| 0 | 0 | 0 | 1 | 0 | 0 | 0 | 1 | 0 |

122

| 0 | 0 | 0 | 0 | 0 | 0 | 0 | 0 | 0 |
|---|---|---|---|---|---|---|---|---|
| 0 | 0 | 0 | 0 | 0 | 25 | 0 | 0 | 0 |
| 0 | 0 | 20 | 25 | 0 | 0 | 0 | 0 | 0 |
| 0 | 0 | 0 | 0 | 0 | 0 | 0 | 0 | 0 |
| 0 | 20 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

HOUGH TRANSFORMATION DEINTERLACING CIRCUITRY

BACKGROUND

Integrated circuits generally include logic blocks that are used to implement a wide variety of functions including image processing algorithms, allowing the integrated circuits to be used in video processing applications such as video surveillance and other video systems.

Integrated circuit devices in video processing systems typically include video processing circuitry for processing video data. In some scenarios, the video processing circuitry can be used to process interlaced video data. As is well known, an interlaced video or image contains two fields of pixel lines such as a field displaying the odd numbered rows and another field displaying the even numbered rows of a frame of interlaced video data. The frame needs to be converted to a non-interlaced format (a "deinterlaced" format) prior to being displayed on display equipment such as a progressive scan monitor.

Some conventional image processing devices deinterlace the interlaced video data by interpolating pixel values for missing rows of pixels in one of the fields using pixel values located immediately above and immediately below the pixel to be interpolated in the video field. However, when the video data contains low-angle edges (i.e., edges having an angle relative to horizontal of less than 45 degrees and greater than −45 degrees), the video field may include insufficient data to properly resolve the low-angle edges when interpolating the pixel values. Performing interpolation in this manner can generate erroneous interpolated pixel values and deinterlaced video data that contains noticeable image artifacts.

SUMMARY

This relates generally to integrated circuits and, more particularly, to integrated circuits with video deinterlacing capabilities. An integrated circuit (e.g., a programmable integrated circuit that is provided with configuration data) may be provided with video interpolating circuitry for deinterlacing interlaced video data received from a video source. Each frame of interlaced video data may include a field of pixels from the even-numbered rows of the frame and a field of pixels from the odd-numbered rows of the frame.

The interpolating circuitry may include edge detection circuitry that generates an edge map associated with a field of the video data. For example, the edge detection circuitry may include Sobel transformation circuitry that generates the edge map by performing a Sobel transform on the field. The edge map may be passed to comparator circuitry that compares the edge map to an adjustable edge map threshold value for filtering out weak edges from the edge map (e.g., edges having edge map magnitudes that are less than the edge map threshold value).

The interpolating circuitry may include Cartesian Hough transformation circuitry coupled to the edge detection circuitry that performs Cartesian Hough transforms on the edge map. The Cartesian Hough transformation circuitry may include linear calculation circuitry that determines y-intercept values for a set of lines passing through points on the edge map. For example, the linear calculation circuitry may determine y-intercept values for a set of lines passing through points on the edge map that have a low-angle slope (e.g., the linear calculation circuitry may calculate intercept values only for lines having an angle relative to horizontal of less than or equal to 45 degrees and greater than or equal to −45 degrees or a slope of less than or equal to 1 and greater than or equal to −1). The Cartesian Hough transformation circuitry may include drawing circuitry that draws lines in a Cartesian Hough space based on the intercept values (e.g., by drawing points in a Cartesian Hough space coordinate system).

The Cartesian Hough transformation circuitry may include bin accumulation circuitry that accumulates bins in a Cartesian Hough space histogram (accumulation map) based on the lines drawn by the drawing circuitry in the Cartesian Hough space. The bin accumulation circuitry may pass the Cartesian Hough space histogram to comparator circuitry that compares the histogram to an adjustable Hough Space bin count threshold to filter out bins from the histogram having an insufficient number of counts (e.g., bins having a count that is less than the bin count threshold). The comparator circuitry may pass the filtered Cartesian Hough space histogram to offset mask generation circuitry that generates an offset mask for the field based on the filtered Cartesian Hough space histogram.

The offset mask generation circuitry may pass the offset mask to interpolation circuitry. The interpolation circuitry may generate interpolated pixel values for the missing rows of the field based on the pixels in the field and the offset mask. For example, the interpolation circuitry may combine pixels in the field along directions identified by the offset mask. Prior to generating the interpolated pixel value, the interpolation circuitry may double-check that a pixel to be interpolated is located on a low-angle edge in the field using the edge map. The interpolation circuitry may generate an interpolated pixel value by combining pixel values in the field based on the offset mask in response to determining that the pixel is located on an edge in the field and may generate an interpolated pixel value without using the offset mask in response to determining that the pixel is not located on an edge in the field.

The interpolated pixel values may be used to generate deinterlaced video data. The deinterlaced video data may be free from image artifacts along low-angle edges (e.g., edges having an angle relative to horizontal of less than 45 degrees and greater than −45 degrees).

Further features of the present invention, its nature and various advantages will be more apparent from the accompanying drawings and the following detailed description.

DETAILED DESCRIPTION

Embodiments of the present invention relate to video deinterlacing systems in which one or more devices such as integrated circuits may perform interpolation operations on pixels in fields of interlaced video data. The integrated circuits may be any suitable type of integrated circuit, such as microprocessors, application-specific integrated circuits, graphics processing units (GPUS), digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example.

Figure 1:
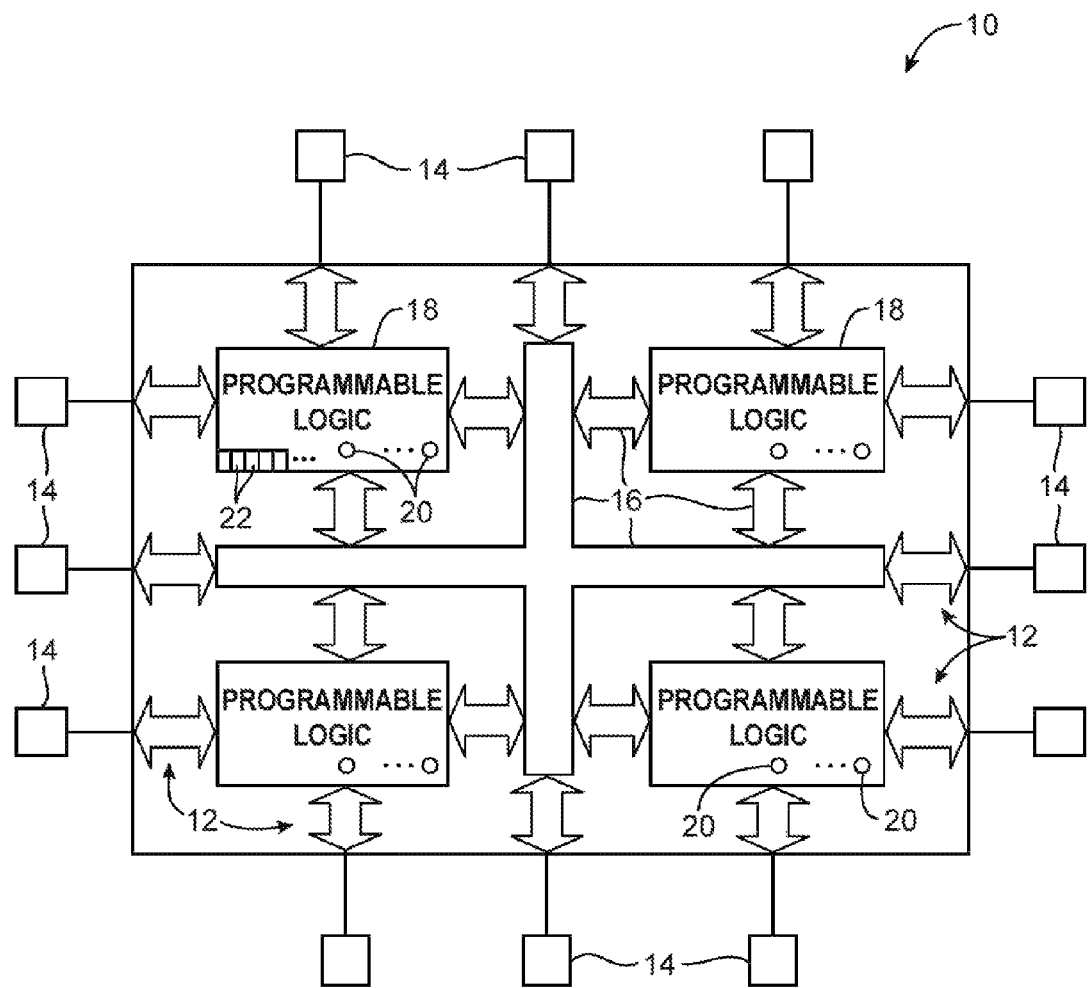
FIG. 1 is a diagram of an illustrative programmable integrated circuit in accordance with an embodiment of the present invention.

FIG. 1 is a diagram of an illustrative integrated circuit such as a programmable integrated circuit 10. Programmable device 10 may include input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include conductive lines and programmable connections between respective conductive lines and are therefore sometimes referred to as programmable interconnects 16.

Programmable device 10 may include programmable logic 18 that can be configured to perform a custom logic function. Programmable logic 18 may include combinational and sequential logic circuitry. The programmable interconnects 16 may be considered to be a type of programmable logic 18.

Device 10 may also contain programmable memory elements 20. Memory elements 20 can be loaded with configuration data (also called programming data) using pins 14 and input-output circuitry 12. Once loaded, the memory elements may each provide a corresponding static control signal that controls the operation of an associated logic component in programmable logic 18. In a typical scenario, the outputs of the loaded memory elements 20 are applied to the gates of metal-oxide-semiconductor transistors in programmable logic 18 to turn certain transistors on or off and thereby configure the logic in programmable logic 18 and routing paths. Programmable logic circuit elements that may be controlled in this way include pass transistors, parts of multiplexers (e.g., multiplexers used for forming routing paths in programmable interconnects 16), look-up tables, logic arrays, various logic gates, etc.

Memory elements 20 may be implemented using any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 20 are loaded with configuration data during programming, memory elements 20 are sometimes referred to as configuration memory, configuration RAM (CRAM), or programmable memory elements.

The circuitry of device 10 may be organized using any suitable architecture. As an example, the logic of device 10 may be organized in a series of rows and columns of larger programmable logic regions 20 each of which contains multiple smaller logic regions 22. The smaller regions 22 may be, for example, regions of logic that are sometimes referred to as logic elements (LEs), each containing a look-up table (LUT), one or more registers, and programmable multiplexer circuitry, may be regions of logic that are sometimes referred to as adaptive logic modules (ALMs), etc. The larger regions 20 may be, for example, logic array blocks (LABs) containing multiple logic elements or multiple ALMs.

During device programming, configuration data may be loaded into device 10 to configure programmable logic regions 22 and programmable logic regions 18 so that their logic resources perform desired logic functions on their inputs and produce desired output signals. For example, CRAM cells are loaded with appropriate configuration data bits to configure adders and other circuits on device 10 to implement desired custom logic designs.

In addition to the relatively large blocks of programmable logic that are shown in FIG. 1, the device 10 generally also includes some programmable logic associated with the programmable interconnects, memory, and input-output circuitry on device 10. For example, input-output circuitry 12 may contain programmable input and output buffers. Interconnects 16 may be programmed to route signals to a desired destination. The example of FIG. 1 in which device 10 is a programmable integrated circuit is merely illustrative. If desired, device 10 may be any desired integrated circuit device such as a graphics processing unit, an application-specific integrated circuit (ASIC), or any other desired integrated circuit device.

Figure 2:
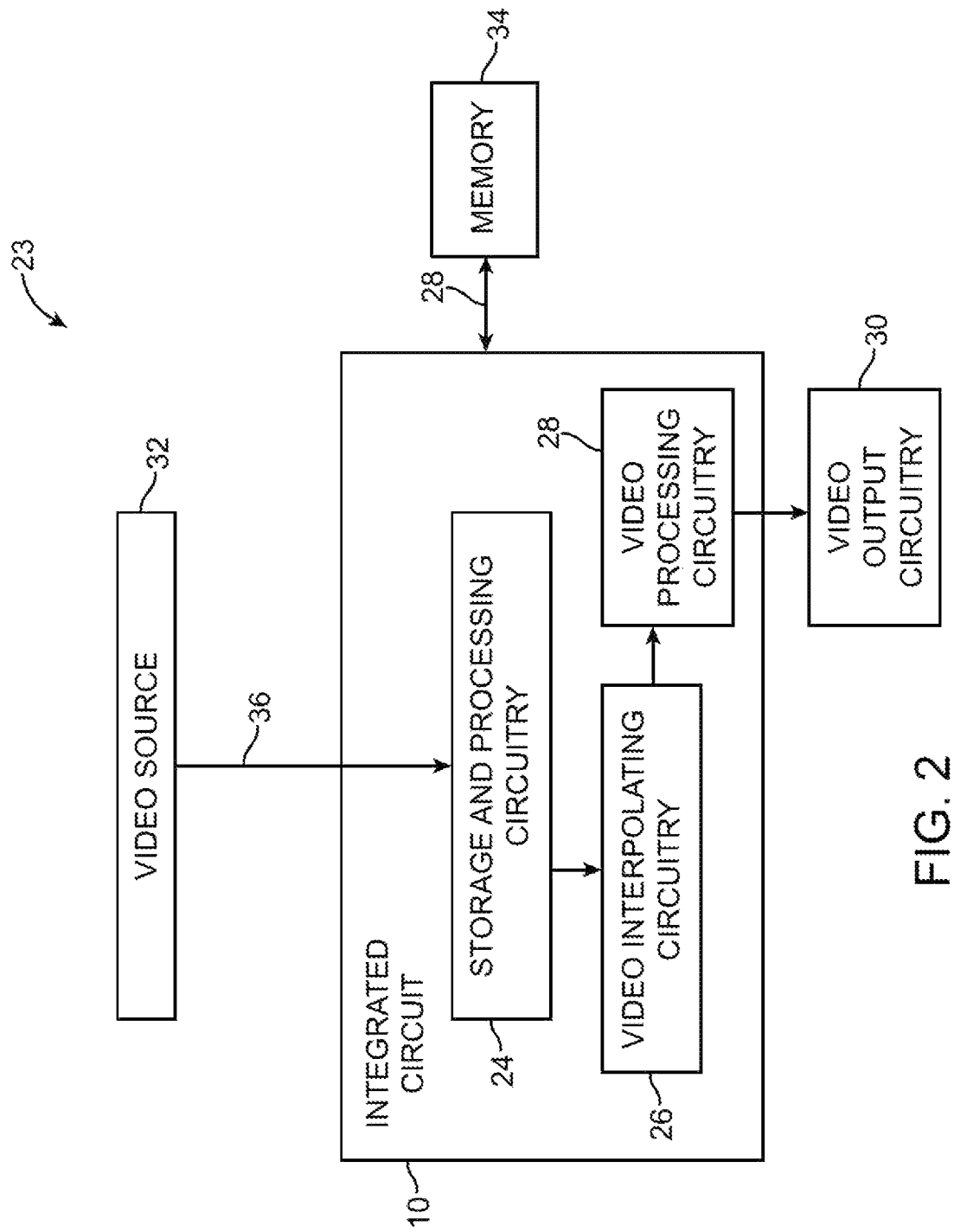
FIG. 2 is a diagram of an illustrative system environment in which a programmable integrated circuit may be coupled to a video source for receiving interlaced video data in accordance with an embodiment of the present invention.

If desired, device 10 may be formed as a part of an image processing system for processing video and image data. As shown in FIG. 2, video system 23 may include device 10, video source 32, memory 34, and video output circuitry 30. Integrated circuit 10 may include storage and processing circuitry 24 that is coupled to video source 32. Video source 32 may be formed separate from integrated circuit 10, may be formed on a common substrate as integrated circuit 10 (e.g., integrated circuit 10 and video source 32 may be formed on a common circuit board), may be stacked relative to integrated circuit 10, may be formed as a part of integrated circuit 10, or at any other desired location.

Video source 32 may generate video data and may provide the video data to storage and processing circuitry 24 on integrated circuit 10. Storage and processing circuitry 24 may include non-volatile memory, volatile memory, random access memory, programmable memory, or any other desired storage circuitry for storing video data received from source 32. Storage and processing circuitry 24 may include video processing circuitry that processes the received video data. If desired, processing circuitry 24 may include motion detection circuitry that detects motion in the received image data (e.g., that detects moving objects in the received video data).

Video data generated by video source 32 may include multiple frames (sometimes referred to herein as image frames or video frames), each including a number of pixels arranged in rows and columns. The pixels may be located at corresponding pixel locations (sometimes referred to herein as pixel positions) in the image frame and may have associated pixel values. For example, pixels located in bright portions of a given image frame may have greater pixel values than pixels located in darker portions of the image frame.

If desired, video data generated by video source 32 may include interlaced video data. Each frame of interlaced video data supplied by video source 32 may include a first image field that contains pixels in the even rows of the frame and a second image field that contains pixels in the odd rows of the image frame. The first image field may have missing pixel values for the odd rows of the frame, whereas the second image field may have missing pixel values for the even rows of the frame. Interlaced video often needs to be converted to a non-interlaced form in which each field contains pixel values for each row in the frame in order for the video to be displayed to a viewer. Integrated circuit 10 may include interpolation circuitry such as video interpolating circuitry 26 that converts interlaced video data into a non-interlaced form by interpolating the missing pixel values in each field. For example, interpolating circuitry 26 may interpolate pixel values for pixels in the odd rows of the frame using the first image field and may interpolate pixel values for pixels in the even rows of the frame using the second image field. The process of separating an image frame into first and second image fields and interpolating the pixel values for the missing pixels in each field may sometimes be referred to as video deinterlacing. Image fields that have been interpolated to fill in missing pixel values may sometimes be referred to herein as interpolated image fields or "deinterlaced" image frames. Interpolated image fields generated by interpolating circuitry 26 may sometimes be referred to herein collectively as deinterlaced video data. Interpolating circuitry 26 may, for example, convert a single interpolated video field into a single interpolated frame by interpolating one or both of the first and second fields or may convert a single video field into a single deinterlaced video frame by combining the first and second fields.

Interpolating circuitry 26 may perform video deinterlacing operations on interlaced video data received from source 32 and may provide corresponding deinterlaced video data to video processing circuitry 28. Video processing circuitry 28 may perform additional image processing operations on the deinterlaced video data (e.g., gamma correction operations, contrast adjustments, color adjustments, sharpness adjustments, etc.) and may output the deinterlaced video data to video output circuitry 30. Video output circuitry may include display components or interface circuitry for passing the deinterlaced video to external display equipment such as a monitor, television, or any other suitable display equipment for displaying the deinterlaced video data.

Integrated circuit 10 may be coupled to external memory 34 via path 38. If desired, integrated circuit 10 may pass video data (e.g., fields of pixels received from video source 32) to memory 34. Memory 34 may include non-volatile memory, volatile memory, random access memory, programmable memory, or any other desired storage circuitry. Integrated circuit 10 may read video data stored on memory 38 and may use the read video data to perform pixel interpolation operations on an associated video field. The example of FIG. 2 in which external memory 34 is formed separately from integrated circuit 10 is merely illustrative. If desired, memory 34 may be formed on a common substrate as integrated circuit 10, as a part of integrated circuit 10, stacked relative to integrated circuit 10, or at any other desired location.

Figure 3:
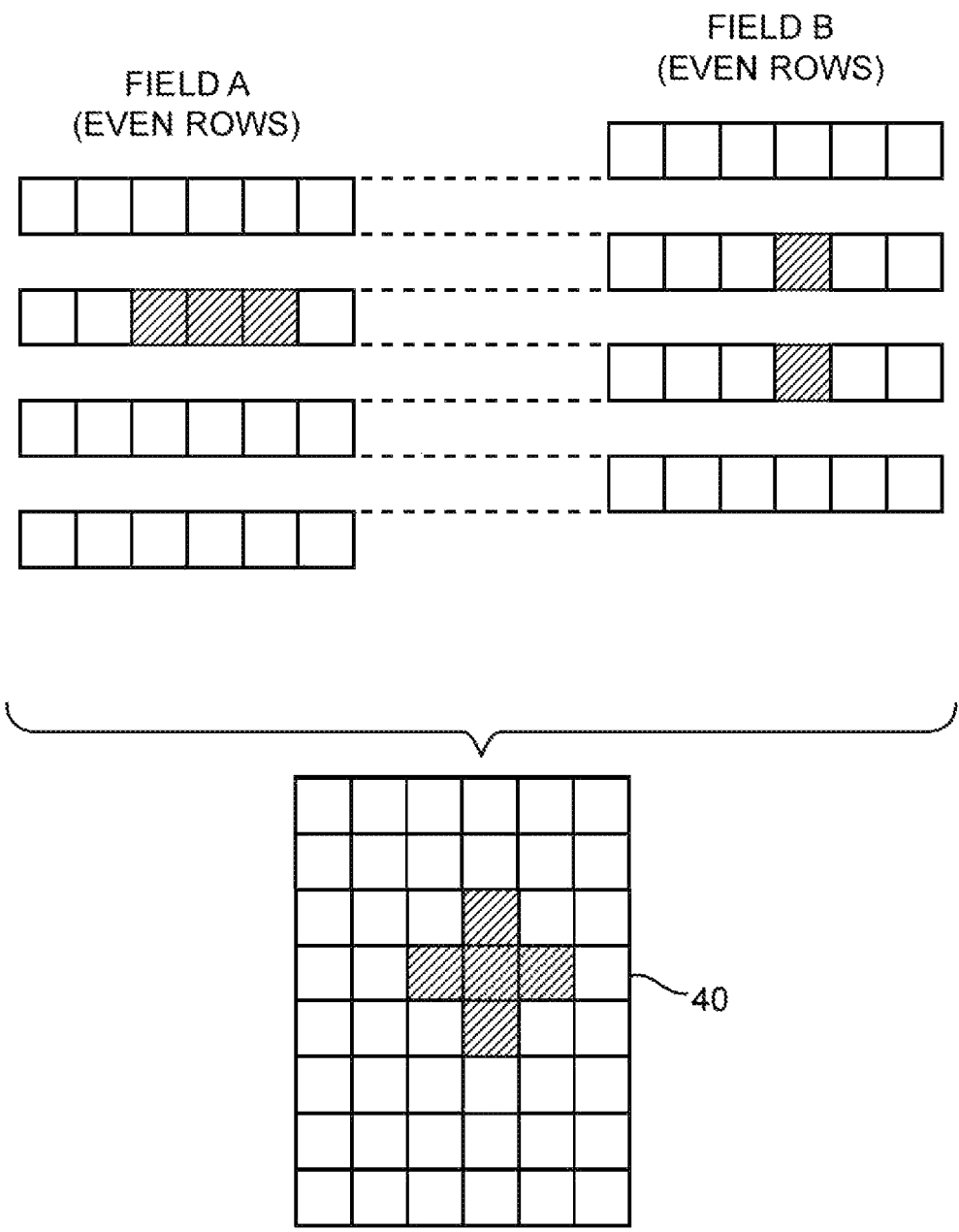
FIG. 3 is an illustrative diagram of two fields of an interlaced video frame received by a programmable integrated circuit from a video source in accordance with an embodiment of the present invention.

FIG. 3 is an illustrative diagram showing how interlaced video data may include two image fields. As shown in FIG. 3, video frame 40 may include interlaced fields A and B. In the example of FIG. 3, field A contains pixels from the even rows of video frame 40 and field B contains pixels from the odd rows of video frame 40. Each image field may show half of the video frame at any given time. As an example, field A may have been captured at a first time and field B may have been captured at a second time subsequent to the first time when the interlaced video data was recorded or captured.

In scenarios where there is no motion in the imaged, fields A and B may be combined to generate a deinterlaced image frame. For example, interlaced frame 40 can be deinterlaced by combining or weaving video fields A and B to form a single deinterlaced frame. While this relatively straightforward method of deinterlacing frame 40 can work well for still images where there is no movement in the imaged scene, simply combining fields A and B may not produce acceptable results when there is movement from one field to another (e.g., when an object moves over time in the video data). Differences between field A and field B due to motion can cause the odd and even lines in the resulting deinterlaced image frame to be slightly displaced relative to each other, which can generate unsightly visual artifacts in the deinterlaced image frame.

In one suitable arrangement, missing pixels in one or both of video fields A and B may be interpolated using information from existing pixels in the same field. For example, interpolated pixel values may be generated for pixels in the missing rows of field A by averaging pixel values adjacent to a particular missing pixel. However, in scenarios where the video frame includes low-angle edges or low-angle lines, there can be insufficient video data near the missing pixels to perform accurate pixel value interpolation. Low-angle edges and lines are defined herein as any edge or angle in the video data having an angle relative to horizontal of less than 45 degrees and greater than −45 degrees.

Figure 4:
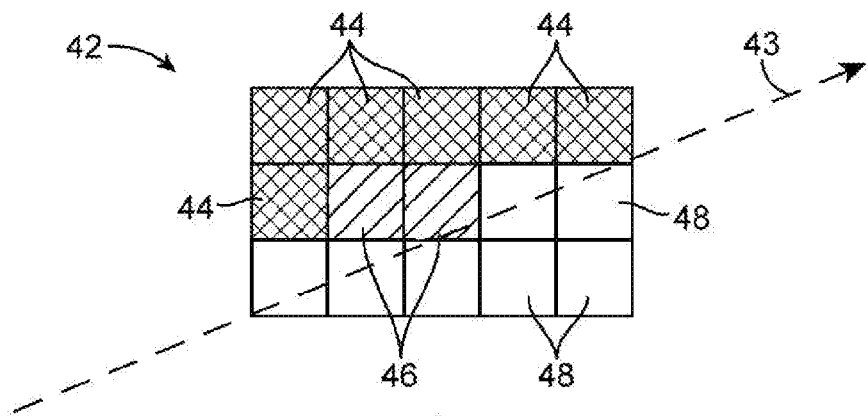
FIG. 4 is an illustrative diagram of an interlaced video frame having a low-angle edge in accordance with an embodiment of the present invention.

FIG. 4 is an illustrative diagram of an interlaced video frame having a low-angle edge. As shown in FIG. 4, pixels in interlaced video frame 42 may define a low-angle edge along arrow 43. Frame 42 may include black pixels 44 (e.g., pixels with relatively low pixel values), white pixels 48 (e.g., pixels with relatively high pixel values), and grey pixels 46 (e.g., pixels with intermediate pixel values that are greater than the low pixel values and less than the high pixel values) that define the edge along arrow 43. Interlaced video frame 42 may include a first field that contains the even rows of frame 42 interlaced with a second field that contains the odd rows of frame 42.

Figure 5:
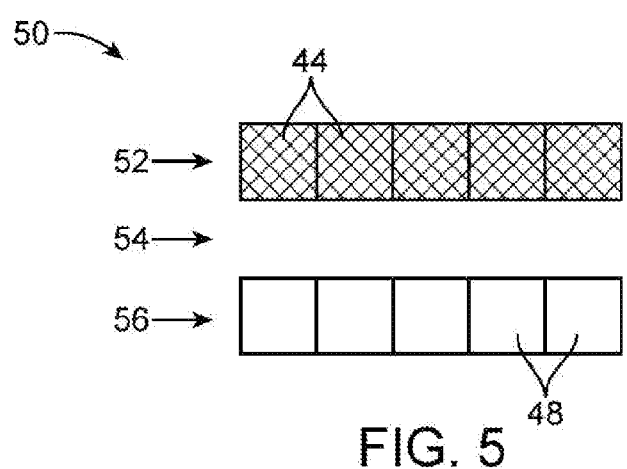
FIG. 5 is an illustrative diagram of a video field of an interlaced video frame of the type shown in FIG. 4 containing missing pixels values to interpolate in accordance with an embodiment of the present invention.

FIG. 5 is an illustrative diagram of the second field of interlaced video frame 42 (e.g., the field containing the odd rows of video frame 42 shown in FIG. 4). As shown in FIG. 5, field 50 may include the first and third rows of video frame 42. Pixel values from rows 52 and 56 may be combined to interpolate pixel values for missing pixel row 54.

Figure 6:
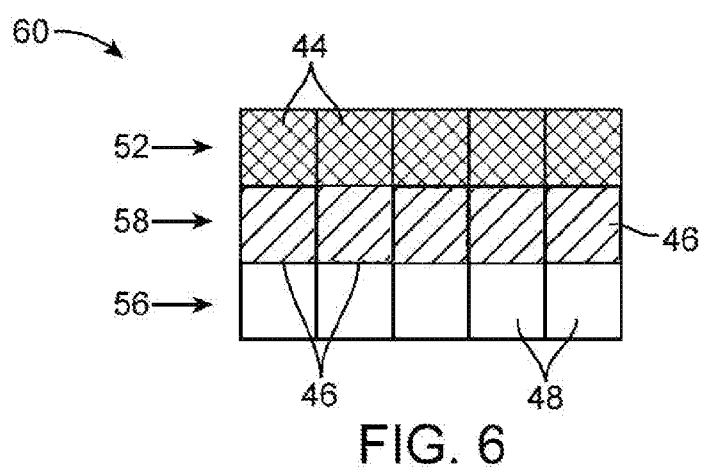
FIG. 6 is an illustrative diagram of an interpolated video frame generated by combining pixel values from a video field of the type shown in FIG. 5 along a vertical direction without low-angle edge information in accordance with an embodiment of the present invention.

FIG. 6 is an illustrative diagram of an interpolated field that may be generated using field 50 of FIG. 5. As shown in FIG. 6, interpolated field 60 includes grey pixel values 46 in interpolated pixel row 58 that are generated by combining black pixels 44 in row 52 of field 50 with white pixels 48 in row 56 of field 50. Interpolated field 60 does not include the white and black pixels present in the second row of interlaced video frame 42 because field 50 has insufficient data to resolve the low-angle edge along arrow 43 in video frame 42. The low-angle edge in frame 42 thereby appears horizontal in interpolated image frame 60 rather than at an angle relative to horizontal (e.g., an angle as shown by arrow 43 of FIG. 4). If care is not taken, interpolation of low-angle edges using a field from interlaced video data can generate erroneous pixel values for the missing pixel rows of the field, resulting in image artifacts in the deinterlaced video data.

Figure 7:
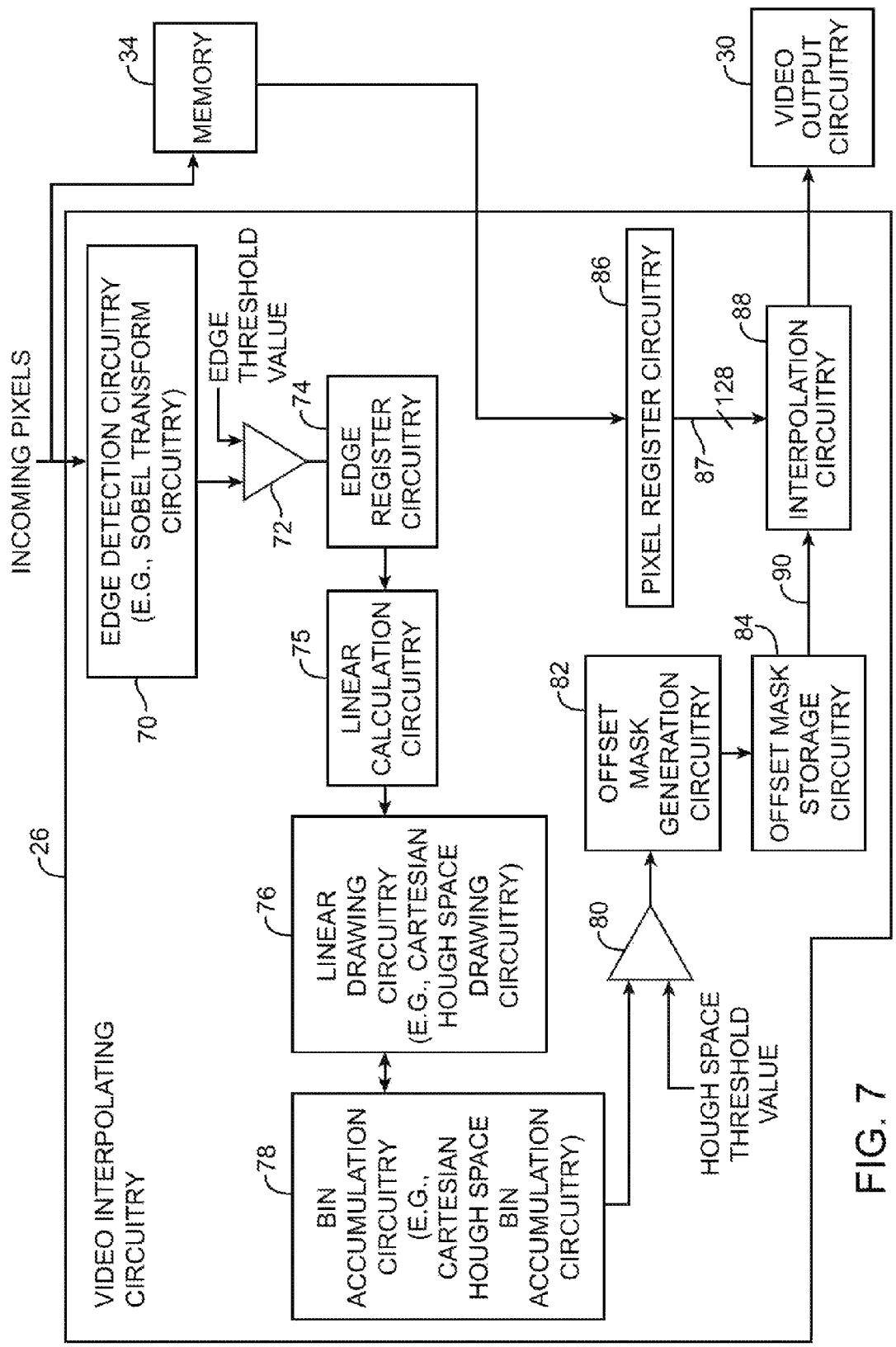
FIG. 7 is a diagram of illustrative video interpolating circuitry that may interpolate video fields having low-angle edges in accordance with an embodiment of the present invention.

Video interpolating circuit 26 on device 10 of FIG. 2 may perform pixel interpolation operations on interlaced video frames having low-angle edges received from source 32. FIG. 7 is an illustrative diagram of video interpolation circuitry such as video interpolating circuitry 26 for interpolating missing pixel values in fields of video data received from video source 32. As shown in FIG. 7, video interpolating circuitry 26 may include edge detection circuitry 70 that receives pixels from video source 32 (e.g., via storage and processing circuitry 24 in FIG. 2). As an example, edge detection circuitry 70 may process pixels from one field at a time for each frame of interlaced video data received from video source 32.

Edge detection circuitry 70 may perform edge detection operations on the received video field. Edge detection circuitry 70 may detect lines or other edges in the video field. For example, edge detection circuitry 70 may detect areas in the image field with significant changes in pixel value intensity or contrast, which often occur on a boundary between two different regions in the image. Edge detection circuitry 70 may generate an edge map of the image field that maps the edges in the image field. Each point on the edge map may include an edge map value. The magnitude of the edge map values may correspond to the strength of the edges in the video field at the associated pixel location. For example, the edge map may have non-zero edge map values at pixel locations in the video field that include an edge and may include edge map values of zero at pixel locations that do not include any edges. In general, higher edge map values correspond to stronger and more pronounced edges in the video field and lower edge map values correspond to weaker and less pronounced edges in the video field.

If desired, edge detection circuitry 70 may include Sobel transform circuitry that detects edges in the video field by performing Sobel transformation operations on the video field (e.g., using a Sobel edge detection algorithm). This example is merely illustrative. If desired, edge detection circuitry 70 may include circuitry that detects edges using any desired edge detection algorithm (e.g., Canny edge detection algorithms, Harris region detection algorithms, or any other desired algorithm).

Edge detection circuitry 70 may output the edge map to edge map comparator circuitry 72. Edge map comparator circuitry 72 may compare the edge map to an edge threshold value and may filter out edge map points having edge map values that are below the edge threshold value. In this way, edge map comparator circuitry 72 may filter out edge map points corresponding to weak edges (e.g., edge map points having edge map values that are less than the edge threshold value). In general, edge maps with a greater number of edges require more processing resources than edge maps with fewer edges. If desired, the edge threshold value may be set and adjusted based on the desired amount of filtering to perform on the edge map.

For example, the edge threshold value may be set to a relatively high threshold value to filter out more edges from the edge map than when the edge threshold value is set to a relatively low threshold value. The edge map threshold value may be set and adjusted by a user or set and adjusted autonomously (e.g., using control signals generated by software running on device 10). If desired, the edge map threshold value may be set based on the available processing resources of device 10. For example, the edge map threshold value may be set to a relatively low value when more processing resources are available and may be set to relatively high value when fewer processing resources are available.

Edge map comparator circuitry 72 may generate a filtered edge map that includes edge map points having edge map values that are greater than or equal to the edge threshold value and may provide the filtered edge map to edge register circuitry 74. Edge map points in the filtered edge map may sometimes be referred to herein as filtered edge map points. Edge register circuitry 74 may store the filtered edge map points for further processing. As an example, register circuitry 74 may store each filtered edge map point as an edge map value and corresponding pixel location (e.g., the edge map value and location of each filtered edge map point may be stored at register 74). If desired, edge register circuitry 74 may store the pixel location of each filtered edge map point as a Cartesian (X,Y) coordinate.

Edge register circuitry 74 may supply filtered edge map points to linear calculation circuitry 75. Linear calculation circuitry 75, linear drawing circuitry 76, and bin accumulation circuitry 78 may perform a Hough transform (e.g., a Cartesian Hough transform) on the filtered edge map. Calculation circuitry 75, drawing circuitry 76, and accumulation circuitry 78 may sometimes be referred to herein collectively as Cartesian Hough transform circuitry.

Linear calculation circuitry 75 may generate low-angle lines passing through each filtered edge map point for a range of different low-angle slope values. For example, linear calculation circuitry 75 may generate a set of lines passing through each filtered edge map point that have a slope of between −1 and +1 (e.g., low-angle lines at an angle of less than or equal to +45 degrees and greater than or equal to −45 degrees relative to horizontal). Linear calculation circuitry 75 may compute y-intercept values for each of the low-angle lines passing through each filtered edge map point. For example, linear calculation circuitry 75 may receive a first filtered edge map point and may compute the y-intercept of each line that passes through the first filtered edge map point that has a slope that is less than 1 and greater than −1 (e.g., for each possible low-angle line passing through the (X,Y) coordinate of the first filtered edge map point). Circuitry 75 may repeat this process to compute y-intercept values of low-angle lines passing through each filtered edge map point received from register circuitry 74.

In general, the Cartesian equation for a first order polynomial (i.e., a line) through a point (X,Y) is as follows:

$$Y=(\Delta Y/\Delta X)*X+C$$

where (ΔY/ΔX) is the slope of the line through point (X,Y) (i.e., where ΔY is the change in the y-coordinate of the line corresponding to a change in the x-coordinate of ΔX), and where C is the y-intercept of the line. If desired, linear calculation circuitry 75 may set ΔY=1 for each of the lines to simplify calculation of y-intercepts C. Linear calculation circuitry 75 may thereby compute the y-intercepts of low-angle lines through the filtered edge map points using the following formula:

$$C=Y-X/\Delta X$$

By setting ΔY=1, linear calculation circuitry 75 may require fewer processing resources to compute y-intercepts C (e.g., because linear calculation circuitry 75 only performs a subtraction operation and a division operation, rather than performing the subtraction operation, division operation, and multiplication operation that would be required if ΔY is not set equal to one). Linear calculation circuitry 75 may, for example, include divider circuitry and summation circuitry that computes the y-intercept values C. For the sake of simplicity, the value ΔX may sometimes be referred to herein as a gradient value of the line, because ΔX represents a simplified form of the slope of the line (e.g., a form of the slope of the line that requires fewer resources to compute than ΔY/ΔX) and serves as a measure of the angle of the line relative to horizontal.

By only calculating y-intercept values C for low-angle lines passing through each filtered edge map point, interpolating circuitry 26 may omit unnecessary processing for high-angle lines (e.g., lines for which low-angle image artifacts are irrelevant) and may avoid computational complications as the slope approaches infinity. Linear calculation circuitry 75 may pass y-intercept values and the associated gradient values ΔX to linear drawing circuitry 76 for additional processing.

Linear drawing circuitry 76 may draw y-intercept values C and the associated gradient values ΔX received from linear drawing circuitry 76 in a Cartesian y-intercept and gradient value space sometimes referred to herein as the Cartesian Hough space. In some scenarios, the y-intercept values and associated gradient values may be drawn in a polar Hough space (e.g., where points are drawn at a particular angle and distance from the origin). However, drawing points in polar Hough space requires performing time-consuming and resource-taxing trigonometric computations that can undesirably increase processing requirements.

Drawing circuitry 76 may therefore plot the y-intercept values C and the associated gradient values ΔX received from linear calculation circuitry 75 in Cartesian Hough space having coordinates (ΔX, C), where gradient value ΔX is plotted along the horizontal axis and y-intercept value C is plotted along the vertical axis. By limiting the lines for which y-intercept values C are computed to low-angle lines through the filtered edge point values, linear drawing circuitry 76 and linear calculation circuitry 75 may avoid performing computations involving infinite slope values.

Linear drawing circuitry 76 may draw a line in Cartesian Hough space for each filtered edge point (e.g., using each gradient and corresponding y-intercept value associated with a given filtered edge map point to plot the line). For example, a given line drawn by linear drawing circuitry 76 in the Cartesian Hough space may correspond to the set of all low-angle lines passing through the associated filtered edge map point. Linear drawing circuitry 76 may draw additional lines in Cartesian Hough space that each correspond to the low-angle lines passing through an associated filtered edge point.

Linear drawing circuitry 76 may determine points in the Cartesian Hough space where more than one of the drawn line intersect (sometimes referred to herein as intersection points). Each intersection point has an associated gradient value ΔX and y-intercept value C in Cartesian Hough space. Linear drawing circuitry 76 may, if desired, determine the number of lines drawn in the Cartesian Hough space that intersect at each intersection point. Linear drawing circuitry 76 may pass the intersection points (e.g., the Cartesian Hough space coordinate (ΔX, C) and information about the number of lines passing through that coordinate in the Cartesian Hough space) to bin accumulation circuitry 78.

Bin accumulation circuitry 78 may include Cartesian Hough space bin accumulation circuitry that accumulates the information about the Cartesian Hough space intersection points into bins in Hough Space accumulation map (e.g., a binned histogram in Cartesian Hough space sometimes referred to herein as a Hough Space accumulation map or accumulation map). Bin accumulation circuitry 78 may accumulate bins in Cartesian Hough Space as each subsequent filtered edge point is processed and as each intersection point is received from linear drawing circuitry 76. Each bin in the Hough space accumulation map may, for example, have a count that corresponds to the number of filtered edge map points on a given edge in the filtered edge map. For example, if a bin of the accumulation map corresponding to gradient ΔX=0.3 and y-intercept C=3 has 20 counts, the filtered edge map may have 20 filtered edge map points that lie along a line having gradient ΔX=0.3 and y-intercept C=3.

Bin accumulation circuitry 78 may provide the Hough space accumulation map to Hough space comparator circuitry 80. Hough space comparator circuitry 80 may compare bins in the accumulation map to a Hough space bin count threshold value (sometimes referred to herein as a Hough space threshold value), and may filter out bins in the accumulation map having a count that is below the Hough Space threshold value. In this way, edge map comparator circuitry 72 may filter out edges in the filtered edge map that have an insufficient number of filtered edge map points.

If desired, the Hough space threshold value may be set and adjusted based on the desired amount of filtering to perform on the accumulation map. For example, the Hough Space threshold value may be set to a relatively high value to filter out more bins from the accumulation map than when the Hough space threshold value is set to a relatively low value. The Hough space threshold value may be set and adjusted by a user or set and adjusted autonomously (e.g., using control signals generated by software running on device 10). If desired, the Hough space threshold value may be set based on the available processing resources of device 10. For example, the Hough space threshold value may be set to a relatively low value when more processing resources are available and may be set to a relatively low value when fewer processing resources are available. Hough space comparator circuitry 80 may generate a filtered Hough space accumulation map that includes bins having counts that are greater than or equal to the Hough space threshold value and may provide the filtered Hough space accumulation map to offset mask generation circuitry 82.

Offset mask generation circuitry 82 may include drawing circuitry that draws a line corresponding to each bin from the filtered Hough Space accumulation mask to an offset mask in Cartesian (X,Y) space. For example, in a scenario where a given bin of the filtered Hough space accumulation map has gradient $\Delta X=0.3$ and y-intercept $C=3$, offset mask generation circuitry 82 may draw a line having gradient $\Delta X=0.3$ and y-intercept $C=3$ onto the offset mask. The lines drawn by offset mask generation circuitry 82 may substantially correspond with strong low-angle edges in the video frame received by interpolating circuitry 26 (e.g., where the number of lines drawn in the offset mask depends on the edge map threshold value and the Hough space threshold value used in generating the filtered Hough space accumulation map).

Offset mask generation circuitry 82 may use the ($\Delta X,C$) values of the non-zero bins in the filtered Hough Space accumulation map to write the gradient value $\Delta X$ at each Cartesian (X,Y) pixel location of the video field to create the offset mask (e.g., a six bit offset mask or an offset mask of any desired size). The offset mask may, for example, include an offset value at each pixel location in the video field, where the offset value corresponds to a gradient value $\Delta X$ from the filtered Hough Space accumulation map.

For example, each offset value may be indicative of the gradient value $\Delta X$ of a strong edge in the video field that passes through that pixel location. Points in the video field that are not on an edge or are on weak edges in the video field (e.g., points on edges having an edge map value below the edge threshold value or on edges corresponding to Hough space accumulation map bins having fewer counts than the Hough space threshold value) may have an associated offset mask value of zero. Offset mask generation circuitry 82 may pass the generated offset mask to storage circuitry 84. Storage circuitry 84 may store the offset mask for use in generating interpolated pixel values for the missing rows of the corresponding video field.

If desired, storage and processing circuitry 24 (FIG. 2) may supply the field of pixels that is being interpolated by interpolating circuitry 26 to memory 34 for storage while interpolating circuitry 26 performs edge detection, bin accumulation, and offset mask generation operations on the field of pixels. Memory 34 may pass the stored field of pixels to pixel register circuitry 86. Pixel register circuitry 86 may supply the pixels in the video field to interpolation circuitry 88 over data line 87 and offset mask storage circuitry 84 may pass the offset mask to interpolation circuitry over line 90. Interpolation circuitry 88 may generate interpolated pixel values for the missing rows of the video field based on the offset mask and the pixel values received from register 86. For example, the interpolated pixel values may be computed by combining the pixel values in the video field received from register 86 along directions indicated by the offset mask values received from storage circuitry 84 (e.g., by combining pixel values from the field along directions identified by the offset mask). By combining the pixel values based on the offset mask, interpolation circuitry 88 may generate accurate interpolated pixel values for the missing pixels in the video field even when the missing pixels are located on low-angle edges in the video frame. The interpolated pixel values may be free from image artifacts along the low-angle edges.

Interpolation circuitry 88 may generate an interpolated field and may provide the interpolated field to video output circuitry 30. Video interpolating circuitry 26 may receive additional fields of video data and may perform interpolation operations on the additional video fields. In this way, video interpolating circuitry 26 may provide deinterlaced video data to video output circuitry 30 that is free from low-angle edge artifacts.

Figure 8:
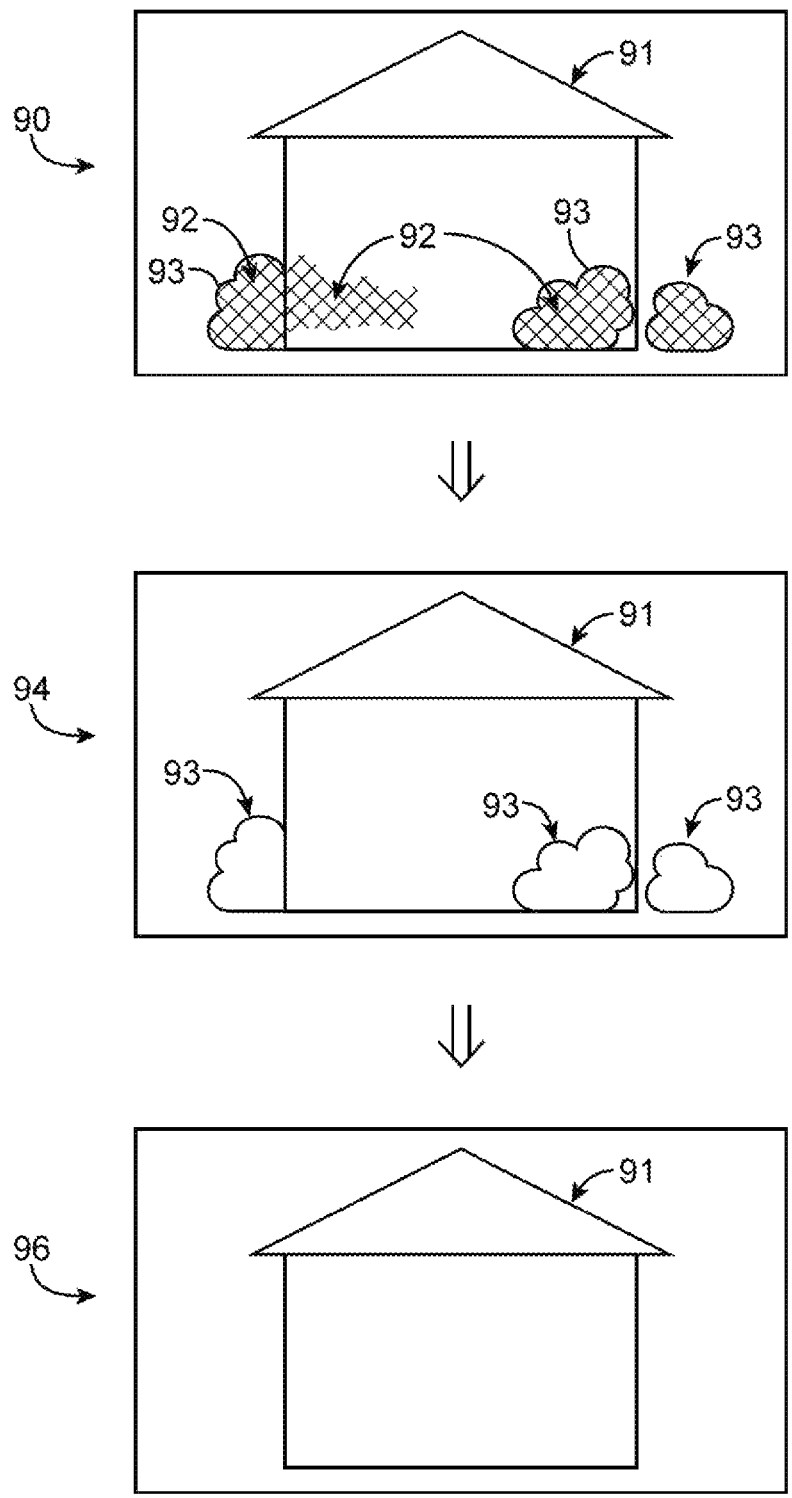
FIG. 8 is an illustrative diagram showing how edge detection circuitry and edge comparator circuitry may generate a filtered edge map of a video field having low-angle lines in accordance with an embodiment of the present invention.

FIG. 8 is an illustrative diagram showing how edge detection circuitry 70 and comparator circuitry 70 may generate a filtered edge map using a received video field. As an example, the video data received by interpolating circuitry 26 may include a scene of a house and bushes. As shown in FIG. 8, field 90 may be provided to edge detection circuitry 70 of FIG. 7. In the example of FIG. 8, field 90 is shown as having solid lines of pixel values throughout the field for the sake of simplicity. In practice, field 90 may include the even rows of an associated video frame or the odd rows of the associated video frame (e.g., in practice, every-other row of field 90 includes missing pixel values). In the example of FIG. 8, video field 90 depicts a scene having a house 91 and bushes 93. Video field 90 may include shaded portions 92 that do not contain any substantial edges. Bushes 93 may, for example, have weaker or less pronounced edges than house 91.

Edge detection circuitry 70 may generate edge map 94 based on video field 90. Edge map 94 may represent the edges in video field 90. In the example of FIG. 8, edge map 94 includes edge map points corresponding to the edges of house 91 and the edges of bushes 93 without shaded edge-free regions 92 from video field 90. Edge detection circuitry 70 may pass edge map 94 to comparator circuitry 72 (FIG. 7). Comparator circuitry 72 may compare the edge map values from edge map 94 to an edge threshold value to generate filtered edge map 96 in which edge map points having edge values with a magnitude that is less than the edge threshold value are filtered out.

In the example of FIG. 8, bushes 93 have weak edges (e.g., the edges of bushes 93 have edge map values that are below the threshold edge value). Comparator circuitry 72 may remove the edge map values corresponding to the edges of bushes 93 from edge map 94 while generating filtered edge map 96. Filtered edge map 96 may include filtered edge map values corresponding to the edges of house (e.g., because the edges of house 91 have edge map values that are greater than or equal to the edge threshold value). Comparator circuitry 72 may pass filtered edge map 96 to register circuitry 74 (FIG. 7). Register circuitry 74 may store filtered edge map 96 (e.g., register circuitry 74 may store the Cartesian (X,Y) pixel location and edge map value of each filtered edge map point in map 96).

Figure 9:
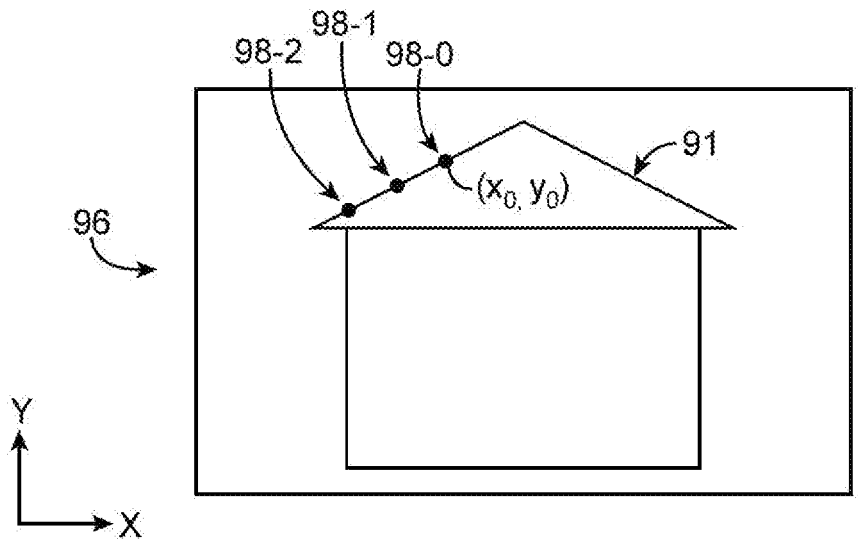
FIG. 9 is an illustrative diagram showing how linear calculation circuitry may identify filtered edge map points in a filtered edge map of a video field in accordance with an embodiment of the present invention.

FIG. 9 is an illustrative diagram showing how linear calculation circuitry 75 of FIG. 7 may identify filtered edge map points located on edges in filtered edge map 96. As shown in FIG. 9, filtered edge map 96 may include filtered edge map points 98 lying on an edge of house 91 (e.g., a first filtered edge map point 98-0, a second filtered edge map point 98-1, a third filtered edge map point 98-2, etc.). First filtered edge map point 98-0 may be located at Cartesian coordinates ($X_0$, $Y_0$) in the filtered edge map. The example of FIG. 9 shows only three of the filtered edge map points on the edges of house 91 in filtered edge map 96 for the sake of simplicity. However, the edges of house 91 may include any number of filtered edge map points.

Figure 10:
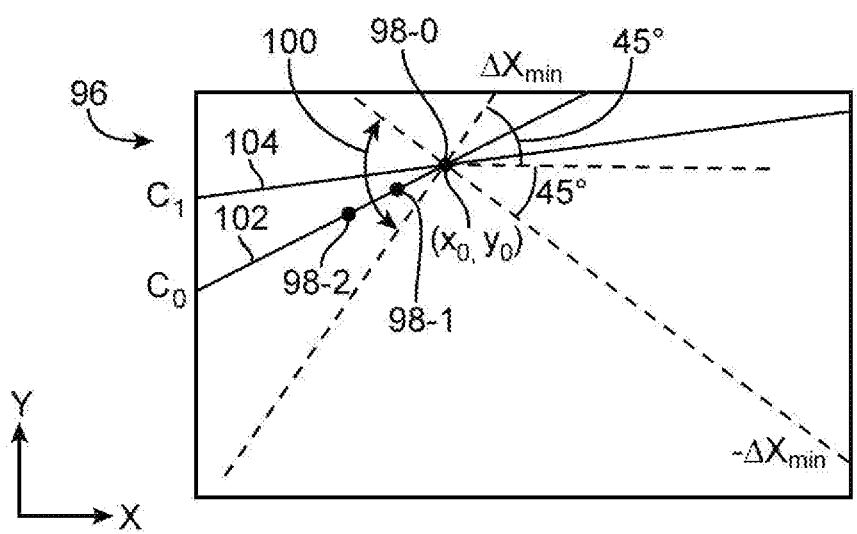
FIG. 10 is an illustrative diagram showing how linear calculation circuitry may compute y-intercept values for low-angle lines that pass through filtered edge map points in a filtered edge map of a video field in accordance with an embodiment of the present invention.

FIG. 10 is an illustrative diagram showing how linear calculation circuitry 75 may determine y-intercept values for lines passing through filtered edge map points in filtered edge map 96. Linear calculation circuitry 75 may calculate the y-intercept value C of every line passing through filtered edge map point 98-0 that has a gradient within range 100 (e.g., circuitry 75 may calculated a y-intercept value of every low-angle line having a gradient value between $\Delta X_{min}$ and $-\Delta X_{min}$ that passes through point $(X_0, Y_0)$).

The example of FIG. 10 shows two lines 102 and 104 having a gradient within range 100 that pass through first filtered edge map point 98-0. In general, any number of low-angle lines may be identified as passing through filtered edge map point 98-0. Line 102 may have a first gradient value $\Delta X_0$. Linear calculation circuitry 75 may calculate a y-intercept value $C_0$ for line 102 (e.g., by subtracting the quotient of first gradient value $\Delta X_0$ and Cartesian coordinate $X_0$ from Cartesian coordinate $Y_0$). Line 104 may have a second gradient value $\Delta X_1$. Linear calculation circuitry 75 may calculate a y-intercept value $C_1$ for line 104 (e.g., by subtracting the quotient of second gradient value $\Delta X_1$ and Cartesian coordinate $X_0$ from Cartesian coordinate $Y_0$). Similarly, circuitry 75 may calculate y-intercept values C for lines of any desired gradient value between $\Delta X_{min}$ and $-\Delta X_{min}$ through point $(X_0, Y_0)$. Circuitry 75 may repeat this process for the remaining points 98 in filtered edge map 96. Circuitry 75 may pass the y-intercept values C and corresponding gradient values $\Delta X$ to linear drawing circuitry 76 (FIG. 7).

Figure 11:
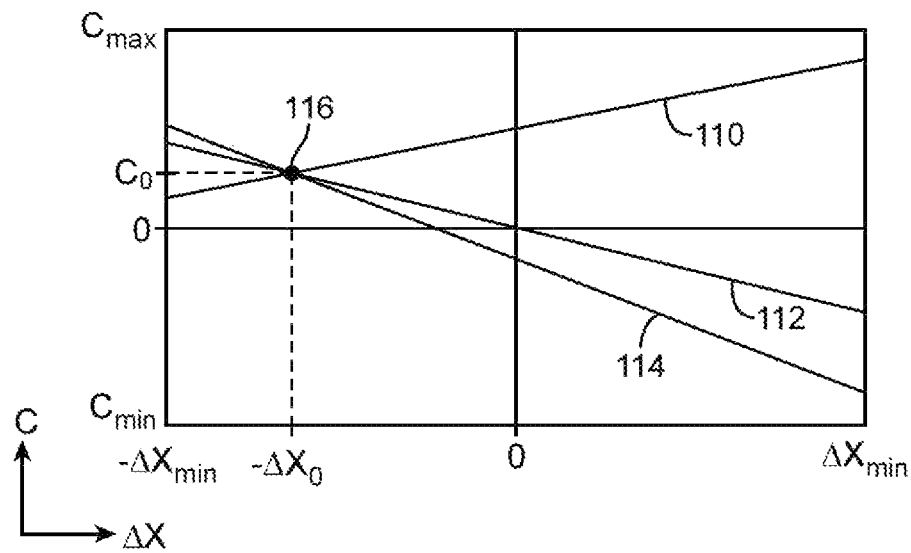
FIG. 11 is an illustrative diagram showing how linear drawing circuitry may draw lines in Cartesian Hough space using y-intercepts and gradient values associated with filtered edge map points in a filtered edge map in accordance with an embodiment of the present invention.

FIG. 11 is an illustrative diagram showing how linear drawing circuitry 76 may draw the y-intercept values and gradient values received from linear calculation circuitry 75 in Cartesian Hough space. As shown in FIG. 11, drawing circuitry 76 may plot the y-intercept values C and gradient values $\Delta X$ in Cartesian Hough space (e.g., a two dimensional space having gradient value $\Delta X$ on the horizontal axis and y-intercept value C on the vertical axis). Line 110 may illustrate all of the y-intercept values and corresponding gradient values received from linear calculation circuitry 75 for first filtered edge map point 98-0 (e.g., line 110 may represent the set of all possible lines through $(X_0, Y_0)$ having a gradient value between $\Delta X_{min}$ and $-\Delta X_{min}$), line 112 may illustrate all of the y-intercept values and corresponding gradient values for second filtered edge map point 98-1, and line 114 may illustrate all of the y-intercept values and corresponding gradient values for third filtered edge map point 98-2.

Figure 12:
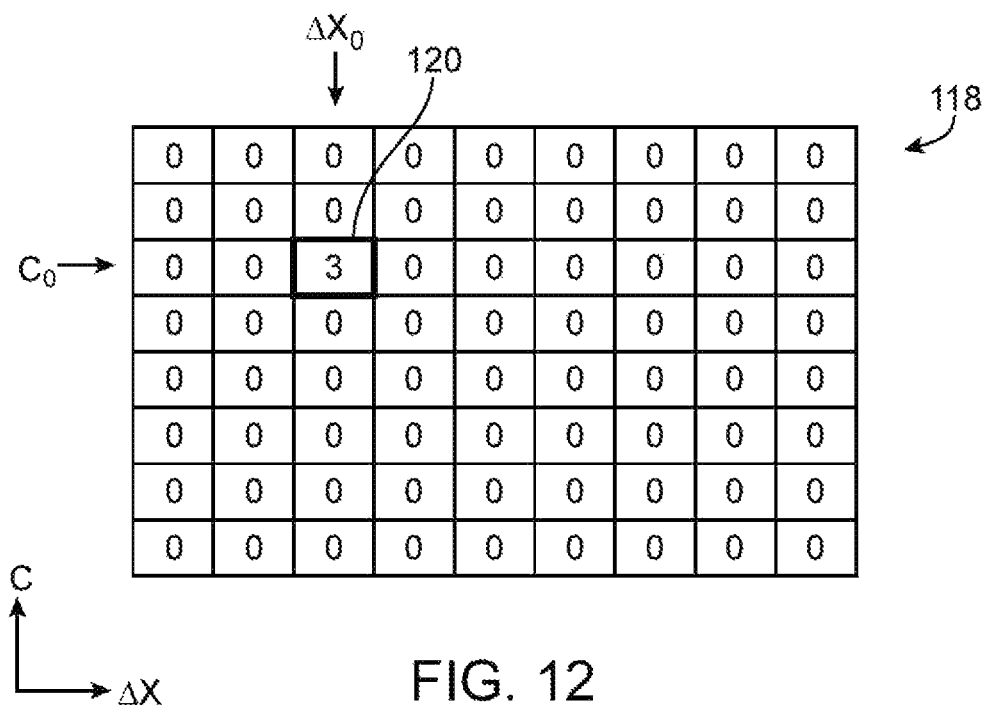
FIG. 12 is an illustrative diagram showing how Hough space bin accumulation circuitry may accumulate bins of a Cartesian Hough space histogram using y-intercepts and gradient values in accordance with an embodiment of the present invention.

Circuitry 76 may identify intersection points where the drawn lines intersect in Cartesian Hough space (e.g., circuitry 76 may identify Cartesian Hough space coordinates $(\Delta X, C)$ associated with the intersection points and the number of drawn lines that intersect at that point). In the example of FIG. 11, circuitry 76 may identify intersection point 116 where lines 110, 112, and 114 intersect. Intersection point 116 may have a gradient value of $\Delta X_0$ and a y-intercept value of $C_0$. Intersection point 116 may, for example, correspond to the edge of house 91 in filtered edge map 96 (FIG. 9) on which each of points 98-0, 98-1, and 98-2 are located. Circuitry 76 may pass the Cartesian Hough space coordinates of intersection point 116 and information about the number of lines that intersect at point 116 to bin accumulation circuitry 78 (FIG. 7). FIG. 12 is an illustrative diagram showing a histogram that may be generated by bin accumulation circuitry 78 using intersection point 116 of FIG. 11. As shown in FIG. 12, histogram 118 may include multiple bins in Cartesian Hough space. Accumulation circuitry 116 may accumulate intersection point 116 into bin 120 corresponding to gradient value $\Delta X_0$ and y-intercept value $C_0$ by accumulating the number of lines intersecting at point 116 into bin 120. In the example of FIG. 12, bin accumulation circuitry 78 accumulates three counts into bin 120, corresponding to the three intersecting lines 110, 112, and 114 drawn by circuitry 76 (e.g., corresponding to the three points 98-0, 98-1, and 98-2 that are located along an edge in filtered edge map 96 having gradient value $\Delta X_0$ and y-intercept value $C_0$). Bin accumulation circuitry 78 may continue to accumulate histogram 118 as additional intersection points are received from drawing circuitry 76 (e.g., as additional filtered edge map points are processed by circuitry 75 and 76).

Figure 13:
FIG. 13 is an illustrative diagram showing how Hough space bin accumulation circuitry may accumulate histogram bins of a Cartesian Hough space histogram for filtered edge points over an entire filtered edge point map in accordance with an embodiment of the present invention.

FIG. 13 is an illustrative diagram showing an example of a histogram (Cartesian Hough space accumulation map) that has been fully accumulated by accumulation circuitry 78 using a filtered edge map such as filtered edge map 96. As shown in FIG. 13, the bins of Cartesian Hough space accumulation map 121 are each populated with a number of counts. The number of counts in each bin of accumulation map 121 may, for example, correspond to the number of lines that intersect at the associated location (e.g., intersection point) in Cartesian Hough space. The bin counts in each bin may, for example, correspond to the number of filtered edge map points that lie along an edge having the corresponding gradient value and y-intercept in the filtered edge map. Accumulation circuitry 78 may supply Cartesian Hough space accumulation map 121 to Hough space comparator circuitry 80 (FIG. 7).

Figure 14:
FIG. 14 is an illustrative diagram showing how a histogram in Cartesian Hough space may be compared to a Hough space threshold to generate a filtered Hough space accumulation map by filtering out bins with insufficient counts in accordance with an embodiment of the present invention.

FIG. 14 is an illustrative diagram showing how Hough space comparator circuitry 80 may filter Cartesian Hough space accumulation maps such as accumulation map 121 of FIG. 13. In the example of FIG. 14, comparator circuitry 80 is provided with a Hough space threshold value of 20. Comparator circuitry 80 may filter out (e.g., set to 0) all bins in accumulation map 121 having a count that is less than 20 to generate filtered Hough space accumulation map 122. This example is merely illustrative. In general, any desired Hough space threshold value may be used. Comparator circuitry 80 may pass filtered Hough space accumulation map 122 to offset mask generation circuitry 82 (FIG. 7).

Figure 15:
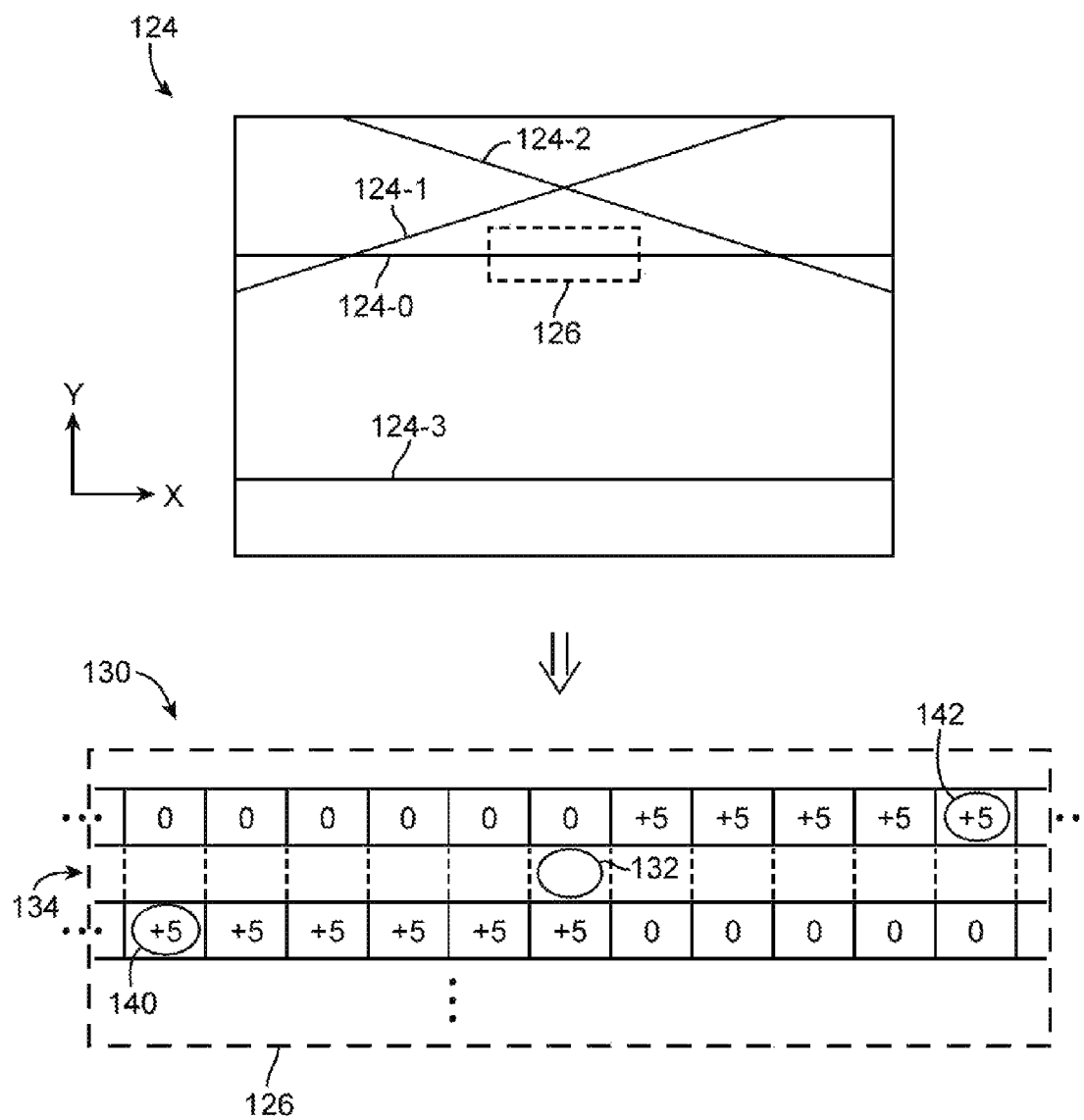
FIG. 15 is an illustrative diagram showing how offset mask generation circuitry may generate an offset mask using a filtered Hough space accumulation map in accordance with an embodiment of the present invention.

FIG. 15 is an illustrative diagram showing how offset mask generation circuitry 82 may generate a Cartesian (X,Y) space offset mask based on filtered Hough space accumulation map 122. As shown in FIG. 15, offset mask generation circuitry 82 may draw lines 124 in Cartesian (X,Y) space, each corresponding to one of the non-zero bins in the Hough space accumulation map received from comparator circuitry 80 (e.g., circuitry 82 may draw a first line 124-0 corresponding to a first non-zero bin in filtered accumulation map 122, a second line 124-1 corresponding to a second non-zero bin in filtered accumulation map 122, etc.). In the example of FIG. 8 where the received video field included a house 91, lines 124 of FIG. 15 may, for example, overlap with the four low-angle edges of house 91 in video field 90.

Offset mask generation circuitry 82 may write the gradient value $\Delta X$ at each point along lines 124 to a Cartesian (X,Y) space offset mask. The offset mask may include an offset value for each pixel in the video field. The offset values may, for example, be gradient values $\Delta X$ of lines 124 passing through each of the pixel locations. As an example, if first line 124-0 has a slope of +1/5 (e.g., a gradient value $\Delta X=+5$), offset mask generation circuitry 82 may generate an offset value of +5 for each pixel location along line 124-0.

As shown in FIG. 15, offset mask generation circuitry 82 may generate offset mask 130 corresponding to portion 126 of the video field. Each point on offset mask 82 may have an offset mask value for a pixel at a corresponding pixel location in the video field. For example, offset mask 130 may include mask values of +5 at pixel locations that lie along line 124-0 (e.g., because line 124-0 has a gradient value of ΔX=+5). If desired, offset mask 130 may include mask values of zero at pixel locations that are not located along any of lines 124. Offset mask generation circuitry 82 may pass offset mask 130 to storage circuitry 84 (FIG. 7).

Storage circuitry 84 may pass offset mask 130 to interpolation circuitry 88. Interpolation circuitry 88 may interpolate pixel values in missing rows such as row 134 of the video field by applying offset mask 130 to pixel values received from pixel register circuitry 86. Interpolation circuitry 88 may generate interpolated pixel values for missing row 134 using any desired interpolation algorithm. In one suitable arrangement, interpolation circuitry 88 generates interpolated pixel values by combining pixel values received from register circuitry 86 along directions identified by offset mask 130.

In the example of FIG. 15, interpolation circuitry 87 may generate an interpolated pixel value for pixel location 132 in missing row 134 of the video field. Interpolation circuitry 88 may identify offset mask values in offset mask 130 that correspond to low-angle lines in the video field that pass through pixel location 132 (e.g., based on the associated gradient value ΔX in the offset mask). For example, interpolation circuitry 88 may identify location 140 in mask 130 having a gradient value of +5 that is located five horizontal pixel locations to the left of pixel 132 and one vertical pixel location below pixel position 132 and location 142 in mask 130 having a gradient value of +5 that is located five horizontal pixel locations to the right of pixel 132 and one pixel location above pixel 132. In other words, the gradient value identified by pixel positions 140 and 142 in offset mask 130 may correspond to a low-angle line in the video field that passes through pixel positions 140, 132, and 142 (e.g., a line having a slope of +1/5 and a gradient value of ΔX=+5).

Interpolation circuitry 88 may generate an interpolated pixel value for pixel location 132 by combining the pixel values at pixel locations 140 and 142 in the field received from register circuitry 82. Interpolation circuitry 88 may generate the interpolated pixel as any suitable function of the pixel values at locations 140 and 142 in the field (e.g., as a linear combination of pixel values at locations 140 and 142 in the field). For example, interpolation circuitry 88 may compute an interpolated pixel value for pixel location 132 using a weighted sum of pixel values at locations 140 and 142, by averaging pixel values at locations 140 and 142, or using any other desired combination of pixel values at locations 140 and 142. In this way, the interpolated pixel value at pixel location 132 may be accurately generated in the direction of an edge in the video data without generating any image artifacts along the low-angle edge.

Figure 16:
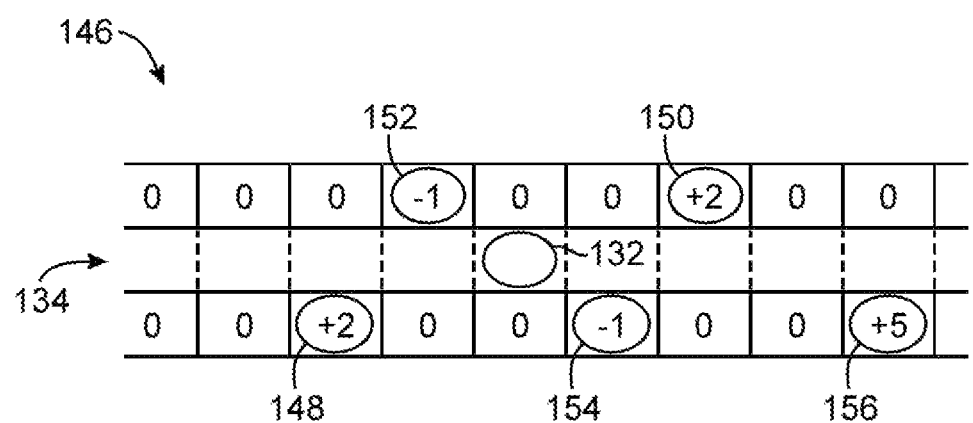
FIG. 16 is an illustrative diagram of an offset mask that may be generated by offset mask generation circuitry for performing pixel interpolation operations in accordance with an embodiment of the present invention.

FIG. 16 shows another illustrative example of an offset mask that may be generated by offset mask generation circuitry 82 and provided to interpolation circuitry 88. As shown in FIG. 16, interpolation circuitry 88 may receive offset mask 146 from storage circuitry 84. Interpolation circuitry 88 may identify offset mask values in offset mask 146 that are located along a common line as pixel position 132 having a gradient value that is equal to the corresponding offset mask values, and may combine pixel values at the pixel positions of these offset mask values to generate the interpolated pixel value. For example, the offset mask value of +2 at pixel position 148 is located two pixel locations to the left and one pixel location below pixel location 132 and offset mask value of +2 at pixel position 150 is located two pixel locations to the right and one pixel location above pixel location 132 (e.g., pixel positions 148, 132, and 150 lie along a common line that has the gradient identified by the offset mask value of +2). Pixel values received from register 86 at pixel locations 148 and 150 may thereby be combined to generate the interpolated pixel value at location 132.

In addition, an offset mask value of −1 is located at pixel position 152 one pixel position to the left and one pixel position above pixel location 132 and an offset mask value of −1 is located at pixel position 154 one pixel position below and one pixel position to the right of pixel location 132 (e.g., pixel positions 152, 132, and 154 lie along a common line that has the gradient identified by the offset mask value of −1). Pixel values received from register 86 at pixel locations 152 and 154 may thereby be combined to generate the interpolated pixel value at location 132.

In the example of FIG. 16 in which pixel location 132 lies along two different edges (e.g., a first edge along pixel locations 152, 132, and 154, and a second edge along pixel locations 148, 132, and 150), pixel values at locations 152, 150, 148, and 154 may be combined to generate the interpolated pixel value at location 132 (e.g., the interpolated pixel value may be computed as any desired function of pixel values at locations 152, 150, 148, and 154). For example, an interpolated pixel value may be computed for location 132 by performing a linear combination of pixel values at locations 152, 150, 148, and 154.

Offset mask 16 may include additional non-zero offset mask values such as an offset mask value of +5 at pixel location 156. However, since an offset mask value of +5 at location 156 corresponds to a positive-gradient line that does not pass through pixel location 156 and pixel 132, the pixel value at location 156 may be omitted from processing when computing the interpolated pixel value for pixel 132. In this way, interpolation circuitry 88 may generate interpolated pixel values for the missing rows of the video fields without generating image artifacts in regions of the video field having low-angle edges.

Figure 17:
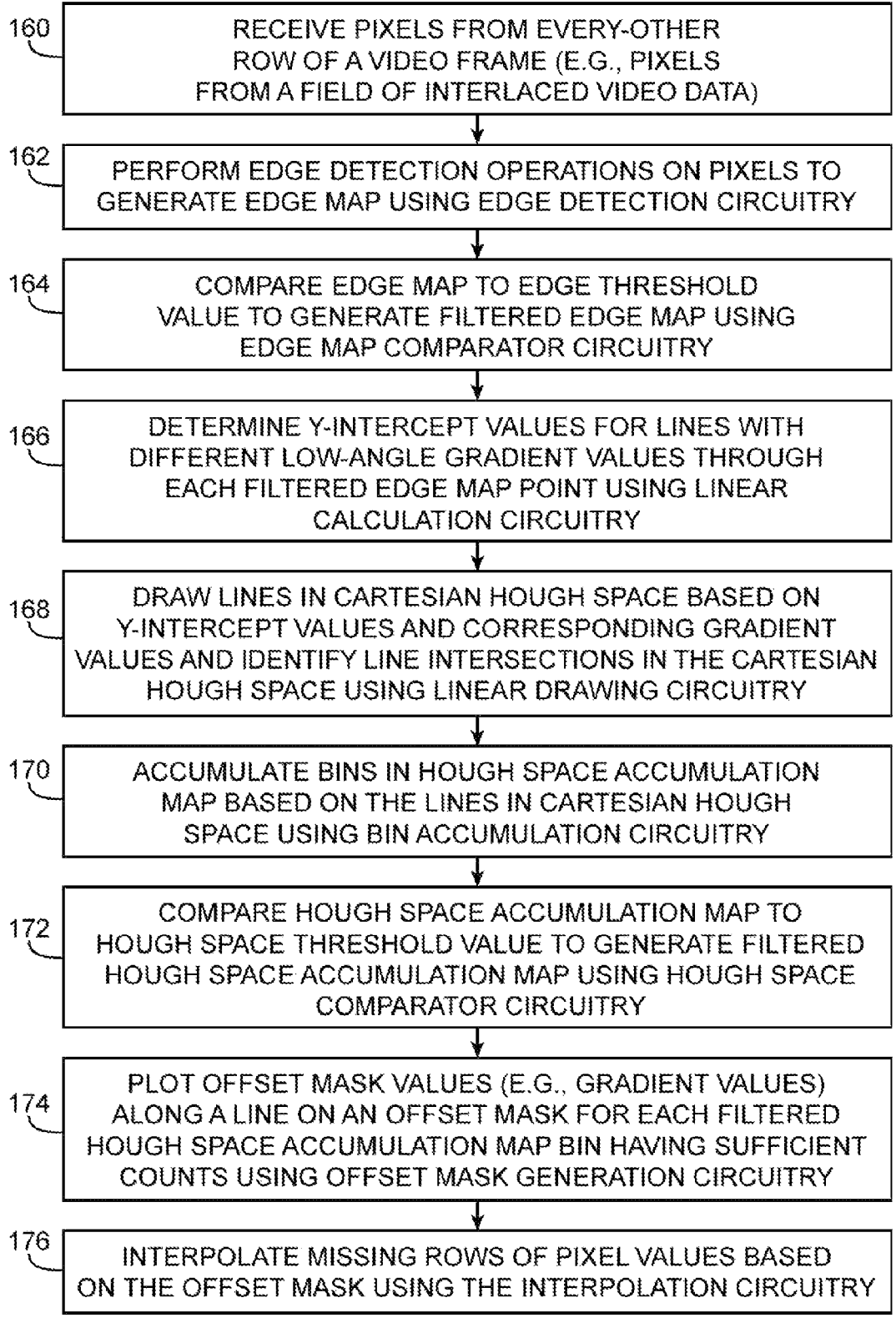
FIG. 17 is a flow chart of illustrative steps that may be performed by video interpolating circuitry of the type shown in FIG. 7 to perform interpolation along low-angle edges in a video field in accordance with an embodiment of the present invention.

FIG. 17 is a flow chart of illustrative steps involved in operating video interpolating circuitry 26 (FIG. 7) for performing interpolation operations on interlaced video data received from video source 32. In one suitable arrangement, the steps of FIG. 17 may, for example, be performed by video interpolating circuitry 26 after storage and processing circuitry 24 (FIG. 2) performs motion detection operations on interlaced video data received from video source 32. If no motion is detected in the video data, storage and processing circuitry 24 may deinterlace the video data by combining first and second video fields of the video data (e.g., odd-row and even-row video fields). If desired, video interpolating circuitry 26 may perform interpolation operations on the received video data when processing circuitry 24 detects motion in the video data (e.g., in scenarios where the first and second video fields are unlikely to properly align when combined). If desired, the steps of FIG. 17 may be performed in a pipelined fashion so that video interpolating circuitry 26 performs live (e.g., real time) processing of video data received from video source 32.

At step 160, edge detection circuitry 70 may receive pixels in every-other row of a video frame from storage and processing circuitry 24. For example, edge detection circuitry 70 may receive a first field of a video frame that only includes pixels in the odd rows of the video frame. In another example, edge detection circuitry 70 receives a second field of a video frame that only includes pixels in the even rows of the video frame.

At step 162, edge detection circuitry 70 may perform edge detection operations on the pixels to generate an edge map. For example, edge detection circuitry 70 may include Sobel transformation circuitry that generates the edge map based on a Sobel transform algorithm. Edge detection circuitry 70 may pass the edge map to edge map comparator circuitry 72.

At step 164, edge map comparator circuitry 72 may compare the edge map to an edge threshold value. Comparator circuitry 72 may generate a filtered edge threshold map by filtering out points on the edge map having an edge map value that is less than the edge threshold value. Filtered edge map points in the filtered edge map may have edge map values that are greater than or equal to the edge threshold value. Comparator circuitry 72 may pass the filtered edge map to edge register circuitry 74. Edge register circuitry 74 may convey filtered edge map points in the filtered edge map to linear calculation circuitry 75. Linear calculation circuitry 75, drawing circuitry 76, and bin accumulation circuitry 78 may perform Cartesian Hough transform operations on the filtered edge map.

At step 166, linear calculation circuitry 75 may determine y-intercept values C for lines with different low angle gradient values $\Delta X$ through each filtered edge map point. For example, linear calculation circuitry 75 may determine the y-intercept values C for all lines having gradient values between gradient value extrema $\Delta X_{min}$ and $-\Delta X_{min}$ (FIG. 10). Gradient value extrema $\Delta X_{min}$ and $-\Delta X_{min}$ may be selected so that linear calculation circuitry 75 only determines y-intercept values for lines having angles relative to horizontal of less than 45 degrees and greater than −45 degrees. Linear calculation circuitry 75 may pass the y-intercept values and associated gradient values to linear drawing circuitry 76.

At step 168, linear drawing circuitry 76 may draw lines in Cartesian Hough space using the y-intercept values C and corresponding gradient values $\Delta X$ (e.g., as shown in FIG. 11). Linear drawing circuitry 76 may identify intersections in the Cartesian Hough space (e.g., circuitry 76 may identify associated y-intercept and gradient values for the intersections) and may identify the number of drawn lines in Cartesian Hough space that pass through each intersection.

At step 170, bin accumulation circuitry 78 may accumulate bins in a Cartesian Hough space accumulation map (e.g., accumulation maps such as map 118 shown in FIG. 12 and map 121 shown in FIG. 13) based on the number of lines drawn in the Cartesian Hough space that pass through each intersection. Bin accumulation circuitry 78 may pass the Cartesian Hough space accumulation map to Hough space comparator circuitry 80. Determining the y-intercept values C using linear calculation circuitry 75, drawing the y-intercept and gradient values using drawing circuitry 76, and accumulating bins of the Cartesian Hough space accumulation map using bin accumulation circuitry 78 may sometimes be referred to herein as performing a Cartesian Hough transform on the filtered edge map.

At step 172, Hough space comparator circuitry 80 may compare the bin counts of the Cartesian Hough space accumulation map to a Hough space threshold value to generate a filtered Cartesian Hough space accumulation map (e.g., a filtered Cartesian Hough space accumulation map such as map 122 as shown in FIG. 14). Hough space comparator circuitry 80 may filter out bins from the Cartesian Hough space accumulation map having a count that is less than the Hough space threshold value. Comparator circuitry may pass the filtered Cartesian Hough space accumulation map to offset mask generation circuitry 82.

At step 174, offset mask generation circuitry 82 may plot offset mask values (e.g., gradient values $\Delta X$) along a line on an offset mask (e.g., an offset mask such as mask 130 shown in FIG. 15 and mask 146 shown in FIG. 16) for each non-zero bin in the filtered Cartesian Hough space accumulation map. Offset mask generation circuitry 82 may pass the offset mask to offset mask storage circuitry 84.

Offset mask storage circuitry 84 may pass the offset mask to interpolation circuitry 88. Pixel register circuitry 86 may pass pixels from the video field to be interpolated to interpolation circuitry 88. At step 176, interpolation circuitry 88 may interpolate missing rows of pixel values in the video field based on the offset mask and the pixel values in that field. For example, interpolation circuitry 88 may combine pixel values from the pixels received from register circuitry 86 at pixel locations identified by the offset mask. Interpolation circuitry 88 may output interpolated video fields to video output circuitry 30 (see FIGS. 2 and 3).

Figure 18:
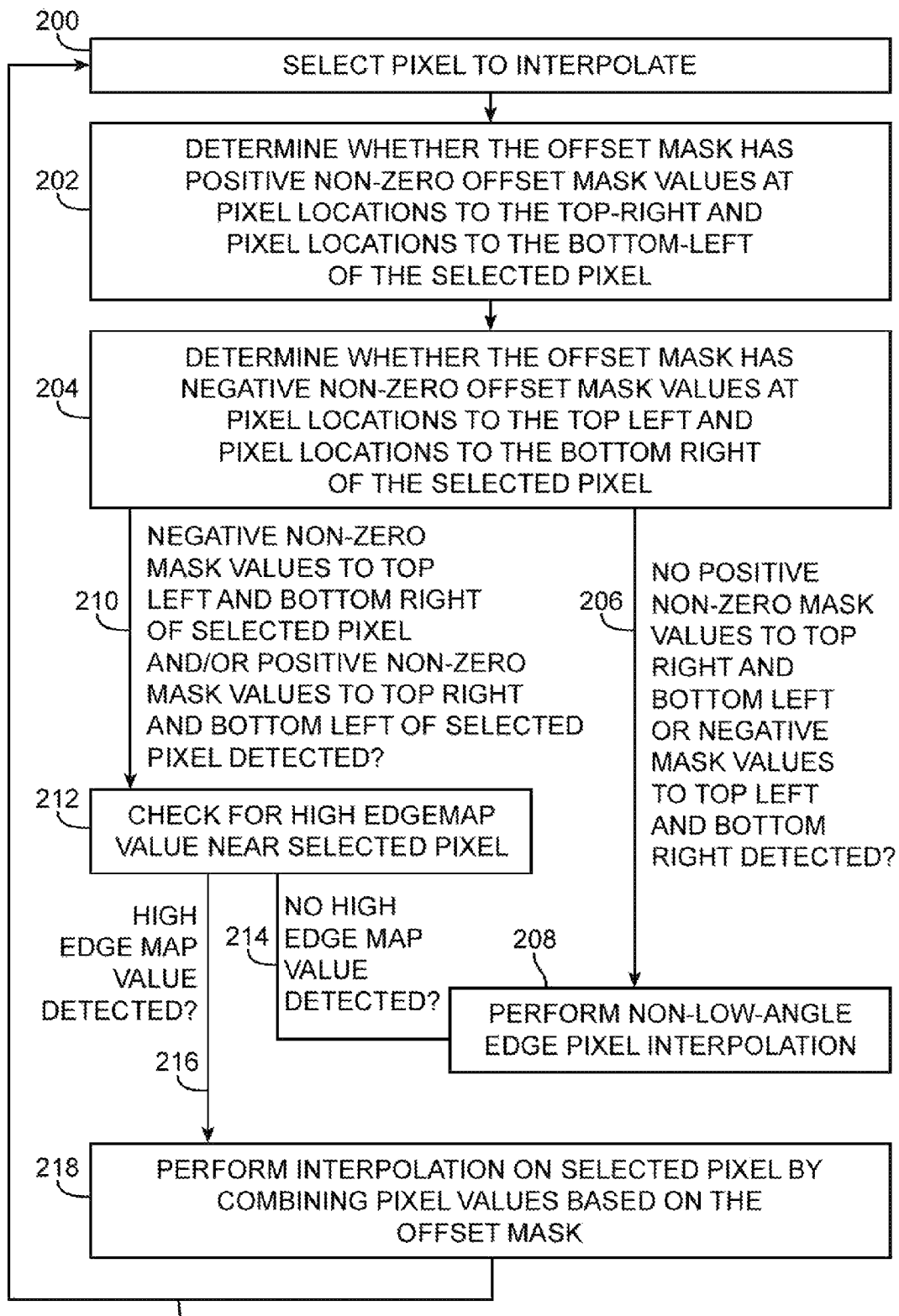
FIG. 18 is a flow chart of illustrative steps that may be performed by interpolation circuitry to generate interpolated pixel values using an offset mask in accordance with an embodiment of the present invention.

FIG. 18 is a flow chart of illustrative steps that may be performed by pixel interpolation circuitry 88 to interpolate pixel values for a given video field. The steps of FIG. 18 may, for example, be performed during processing of step 176 of FIG. 17 (e.g., after receiving an offset mask from offset mask storage circuitry 84 and pixels from pixel register circuitry 86 of FIG. 7).

At step 200, interpolation circuitry 88 may select a pixel in a row of missing pixel values in the video field to interpolate. For example, interpolation circuitry 88 may select a pixel at location 132 as shown in FIG. 16 for interpolation.

At step 202, interpolation circuitry 88 may determine whether the offset mask has positive non-zero offset mask values at pixel locations to the top-right and bottom-left of the selected pixel. In the example where interpolation circuitry 88 receives offset mask 146 of FIG. 16, interpolation circuitry 88 may determine that mask 146 has positive offset mask values to the bottom-left (e.g., at pixel location 148) and to the top-right (e.g., at pixel location 150) of selected pixel 132. If no positive offset mask values are located to the bottom-left or top-right or pixel 132, pixel 132 may not lie along a low-angle edge having a positive slope in the video frame.

At step 204, interpolation circuitry 88 may determine whether the offset mask has negative non-zero offset mask values at pixel locations to the top-left and bottom-right of the selected pixel. For example, interpolation circuitry 88 may determine that offset mask 146 of FIG. 16 has a negative offset mask value to the top-left of pixel 132 (e.g., at pixel location 152) and a negative offset mask value to the bottom-right of pixel 132 (e.g., at pixel location 154). If no negative offset mask values are located to the top-left or bottom-right of pixel 132, pixel 132 may not lie along a low-angle edge having a negative slope in the video frame.

If interpolation circuitry 88 determines that the offset mask has no positive non-zero mask values to the top-right and bottom-left of the selected pixel and that the offset mask has no negative non-zero mask values to the top-left and bottom-right of the selected pixel, processing may proceed to step 208 as shown by path 206. In this case, the selected pixel may not lie on a low-angle edge.

At step 208, interpolation circuitry 88 may omit low-angle interpolation operations on the selected pixel. Interpolation circuitry 88 may interpolate the pixel value for the selected pixel using any desired pixel interpolation algorithm (e.g., an algorithm that combines pixel values immediately above and below the selected pixel to interpolate, etc.). By checking that the offset mask has negative non-zero offset mask values to the top-left and bottom-right and positive non-zero offset mask values to the top-right and bottom-left of the selected pixel, interpolation circuitry 88 may avoid unnecessary processing power required to perform low-angle edge interpolation on the selected pixel.

If interpolation circuitry 88 determines that the offset mask has positive non-zero mask values to the top-right and bottom-left of the selected pixel and/or that the offset mask has negative non-zero mask values to the bottom-right and top-left of the selected pixel, processing may proceed to step 212 as shown by path 210.

At step 212, interpolation circuitry 88 may compare the region of the video field adjacent to the selected pixel to the edge detection map generated by edge detection circuitry 70 (FIG. 7) to confirm that an edge exists at the selected pixel. Interpolation circuitry 88 may compare edge map values at pixel locations near the selected pixel to a selected threshold value. If one or more of the edge map values is greater than the selected threshold value, interpolation circuitry 88 may determine that an edge does exist in the video frame at the selected pixel and processing may proceed to step 218 as shown by path 218. If no edge map values near the selected pixel are greater than the selected threshold, interpolation circuitry 88 may determine that no edge exists at the selected pixel in the video frame and processing may proceed to step 208 via path 214 to perform normal interpolation for the selected pixel (e.g., along a vertical direction). In one suitable example, interpolation circuitry 88 may check Sobel values of the edge map at pixel locations near the selected pixel. If no Sobel values near the selected pixel are greater than a selected threshold, the selected pixel may not be located on any edge and processing may proceed to step 208 as shown by path 214. If one or more Sobel values near the selected pixel are greater than the selected threshold, the selected pixel may be on an edge and processing may proceed to step 218 as shown by path 216.

At step 218, interpolation circuitry 88 may perform low-angle edge interpolation operations on the selected pixel. For example, interpolation circuitry 88 may perform interpolation on the selected pixel by combining pixel values received from register circuitry 86 (FIG. 7) based on the offset mask. In the example of FIG. 16, interpolation circuitry 88 may generate an interpolated pixel value for selected pixel 132 by computing a linear combination of pixel values in the pixels received from register circuitry 86 at locations 152, 150, 148, and 154. Processing may subsequently loop back to step 200 as shown by path 220 to select additional missing pixels in the video field to interpolate.

The example of FIG. 18 is merely illustrative. If desired, pixel interpolation circuitry 88 may perform both non low-angle edge interpolation operations (e.g., as described in connection with step 208) and combining pixel values based on the offset mask (e.g., as described in connection with step 218) on each pixel to be interpolated (e.g., interpolation circuitry 88 may perform both of steps 208 and 218 on a given pixel to be interpolated). For example, pixel interpolation circuitry 88 may generate a non low-angle edge interpolated pixel value for a given pixel by performing non low-angle edge interpolation operations and may generate a low-angle edge interpolated pixel value for that pixel by performing low-angle edge interpolation operations. Pixel interpolation circuitry 88 may generate a weighted average of the non low-angle edge interpolated pixel value and the low-angle edge interpolated pixel value based on the offset mask and the edge map to interpolate that pixel value.

If desired, integrated circuit 10 of FIGS. 1 and 2 may include additional video deinterlacing circuitry for performing additional video deinterlacing operations in conjunction with video interpolating circuitry 26 on video data received from video source 32. For example, integrated circuit 10 may include motion-adaptive deinterlacing circuitry that implements motion-adaptive deinterlacing schemes such as field weaving for deinterlacing the video data. If desired, integrated circuit 10 may include cadence detection circuitry that implements cadence detection deinterlacing schemes for deinterlacing the video data.

The example of FIGS. 10-18 in which lines through the filtered edge map points are characterized by gradient value $\Delta X$ and y-intercept C is merely illustrative. If desired, lines through the filtered edge map points may be characterized using slope ($\Delta Y/\Delta X$) and y-intercept C. The example in which linear calculation circuitry 75 and linear drawing circuitry 76 detect and characterize straight lines in the filtered edge map is merely illustrative. In general, calculation circuitry 75 and drawing circuitry 76 may detect and characterize any desired shapes in the filtered edge map for performing the interpolation. For example, interpolating circuitry 26 may detect and characterize conic functions (e.g., parabolas, ellipses, circles, etc.), higher order polynomial functions (cubic functions, quartic functions, etc.), or any other desired functions.

By performing Cartesian Hough space calculations and performing dynamic thresholding of edge map values and Cartesian Hough space accumulation map values, video interpolating circuitry 26 of FIGS. 2 and 7 may have sufficient computational resources available to perform real-time processing of video data received from video source 32 (e.g., video interpolating circuitry 26 may interpolate fields of video data in real time for displaying using video output circuitry 30). For example, video interpolating circuitry 26 may perform real time high-definition video processing on interlaced high-definition video data such as 1080i video data. The interpolated video data may be free from undesirable artifacts such as low-angle edge artifacts.

The foregoing is merely illustrative of the principles of this invention and various modifications can be made by those skilled in the art without departing from the scope and spirit of the invention. The foregoing embodiments may be implemented individually or in any combination.

What is claimed is:
1. A method of deinterlacing video data using interpolation circuitry, comprising:
 with the interpolation circuitry, generating an edge map that comprises a plurality of edge map values associated with a field of the video data, wherein generating the edge map comprises:
  comparing the plurality of edge map values to an edge map threshold value; and
  filtering out edge map values that are less than the edge map threshold from the edge map;
 with the interpolation circuitry, adjusting the edge map threshold value based on an amount of processing resources available to the interpolation circuitry; and
 with the interpolation circuitry, performing a Cartesian Hough transform on the edge map associated with the field of the video data.

2. The method defined in claim 1, wherein the interpolation circuitry comprises Sobel transformation circuitry and wherein generating the edge map comprises:
 with the Sobel transformation circuitry, performing a Sobel transform on the field to generate the edge map.

3. The method defined in claim 1, wherein performing the Cartesian Hough transform comprises:
 generating a Cartesian Hough space histogram based on the edge map.

4. The method defined in claim 3, further comprising:
 with the interpolation circuitry, generating a filtered Cartesian Hough space histogram by comparing the Cartesian Hough space histogram to a Hough space threshold and filtering out bins of the Cartesian Hough space histogram having a bin count that is less than the Hough space threshold.

5. The method defined in claim 3, further comprising:
with the interpolation circuitry, generating an offset mask for the field based on the Cartesian Hough space histogram.

6. The method defined in claim 5, further comprising:
with the interpolation circuitry, generating deinterlaced video data based on the offset mask and the field of the video data.

7. The method defined in claim 6, wherein generating the deinterlaced video data based on the offset mask and the field of the video data comprises:
identifying a plurality of pixels in the field to combine based on a plurality of mask values in the offset mask; and
combining the identified plurality of pixels to generate an interpolated pixel value.

8. The method defined in claim 1, wherein performing the Cartesian Hough transform comprises:
drawing a set of lines through at least one point on the edge map, wherein each line in the set of lines has a respective slope value; and
computing a y-intercept value for each of the lines in the set of lines.

9. The method defined in claim 8, wherein each slope value is less than or equal to one and greater than or equal to negative one.

10. The method defined in claim 8, wherein drawing the set of lines through the at least one point on the edge map comprises:
drawing only low-angle lines having an angle relative to horizontal of less than or equal to 45 degrees.

11. The method defined in claim 8, wherein performing the Cartesian Hough transform further comprises:
drawing a line in Cartesian Hough space using the y-intercept values and the respective slope values; and
accumulating a Cartesian Hough space histogram based on the line in the Cartesian Hough space.

12. Circuitry for deinterlacing an interlaced frame of pixels, comprising:
edge detection circuitry that generates an edge map by performing edge detection operations on a field of the interlaced frame;
Hough transformation circuitry that generates a Hough space accumulation map based on the edge map, the Hough transformation circuitry comprising:
Cartesian Hough space bin accumulation circuitry that accumulates bins in a Cartesian Hough space histogram based on lines in a Cartesian Hough space;
offset mask generation circuitry that generates an offset mask for the field based on the Hough space accumulation map, wherein the Cartesian Hough space bin accumulation circuitry is coupled to the offset mask generation circuitry; and
interpolation circuitry that generates a deinterlaced frame based on pixels in the field and the offset mask.

13. The circuitry defined in claim 12, wherein the Hough transformation circuitry comprises:
linear calculation circuitry coupled to the edge detection circuitry that determines intercept values for a set of lines passing through a point on the edge map.

14. The circuitry defined in claim 13, wherein the linear calculation circuitry determines the intercept values only for lines having an angle relative to horizontal that is less than or equal to 45 degrees and greater than or equal to −45 degrees.

15. The circuitry defined in claim 13, wherein the Hough transformation circuitry further comprises:
Cartesian Hough space drawing circuitry coupled to the linear calculation circuitry that draws the lines in the Cartesian Hough space based on the intercept values.

16. The circuitry defined in claim 12, further comprising:
register circuitry coupled between the Hough transformation circuitry and the edge detection circuitry; and
edge map comparator circuitry coupled between the register circuitry and the edge detection circuitry that compares the edge map to an edge threshold value.

17. The circuitry defined in claim 12, further comprising:
comparator circuitry coupled between the Hough transformation circuitry and the offset mask generation circuitry that compares the Hough space accumulation map to a Hough space threshold value.

18. The circuitry defined in claim 12, wherein the circuitry is formed on a programmable integrated circuit having programmable logic regions.

19. A method of deinterlacing video data using an integrated circuit, comprising:
with bin accumulation circuitry on the integrated circuit, accumulating a Hough space accumulation map associated with a field of the video data;
with offset mask generation circuitry on the integrated circuit, generating an offset mask based on the accumulated Hough space accumulation map; and
with interpolation circuitry on the integrated circuit, generating an interpolated pixel value at a pixel location in the field by combining pixel values in the field based on the offset mask.

20. The method defined in claim 19, further comprising:
with edge detection circuitry on the integrated circuit, generating a map of edge map values associated with the field of the video data.

21. The method defined in claim 20, further comprising:
with the interpolation circuitry, determining whether the pixel location is on an edge in the field of video data based on the edge map values.

22. The method defined in claim 21, further comprising:
in response to determining that the pixel location is on the edge in the field, generating the interpolated pixel value at the pixel location by combining the pixel values in the field based on the offset mask.

* * * * *